United States Patent
Jindo et al.

(10) Patent No.: US 9,213,490 B2
(45) Date of Patent: Dec. 15, 2015

(54) COMPUTER SYSTEM AND DATA MIGRATION METHOD

(75) Inventors: Kazue Jindo, Odawara (JP); Hidetoshi Sakaki, Odawara (JP); Junichi Muto, Odawara (JP); Shinichi Hiramatsu, Odawara (JP); Jun Miyashita, Odawara (JP)

(73) Assignee: HITACHI, LTD., Tokyo (JP)

( * ) Notice: Subject to any disclaimer, the term of this patent is extended or adjusted under 35 U.S.C. 154(b) by 761 days.

(21) Appl. No.: 13/519,272

(22) PCT Filed: Jun. 18, 2012

(86) PCT No.: PCT/JP2012/003959
§ 371 (c)(1),
(2), (4) Date: Jun. 26, 2012

(87) PCT Pub. No.: WO2013/190590
PCT Pub. Date: Dec. 27, 2013

(65) Prior Publication Data
US 2013/0339647 A1    Dec. 19, 2013

(51) Int. Cl.
*G06F 13/00* (2006.01)
*G06F 3/06* (2006.01)
*G06F 11/14* (2006.01)

(52) U.S. Cl.
CPC .............. *G06F 3/0617* (2013.01); *G06F 3/067* (2013.01); *G06F 3/0635* (2013.01); *G06F 3/0647* (2013.01); *G06F 11/1443* (2013.01); *G06F 2201/82* (2013.01)

(58) Field of Classification Search
CPC combination set(s) only.
See application file for complete search history.

(56) References Cited

U.S. PATENT DOCUMENTS

| | | | |
|---|---|---|---|
| 6,240,494 B1 * | 5/2001 | Nagasawa et al. | 711/165 |
| 2006/0236056 A1 * | 10/2006 | Nagata | 711/165 |
| 2006/0248302 A1 | 11/2006 | Yamamoto et al. | |
| 2007/0050565 A1 * | 3/2007 | Ido et al. | 711/147 |
| 2007/0260840 A1 | 11/2007 | Watanabe | |
| 2008/0104346 A1 * | 5/2008 | Watanabe et al. | 711/162 |
| 2008/0177947 A1 * | 7/2008 | Eguchi et al. | 711/114 |

FOREIGN PATENT DOCUMENTS

| | | |
|---|---|---|
| EP | 1 857 918 A2 | 11/2007 |
| JP | 2005-202495 A | 7/2005 |
| JP | 2004-220450 A | 4/2010 |

* cited by examiner

*Primary Examiner* — Charles Rones
*Assistant Examiner* — Han Doan
(74) *Attorney, Agent, or Firm* — Volpe and Koenig, P.C.

(57) ABSTRACT

The present invention continues host access and holds data of a migration source volume as the latest data even when a fault occurs in any of a plurality of access paths.

Upon receiving a first write command from a host computer via a first access path, the migration source controller writes first update data to the migration source volume and, upon receiving a second write command from the host computer via a second access path, the migration destination controller transfers second update data to the migration source controller via a storage path and, upon receiving the second update data from the migration destination controller, the migration source controller writes the second update data to the migration source volume.

9 Claims, 24 Drawing Sheets

FIG. 8

| GDEV# | DUPLEX ATTRIBUTE | LDEV#1 | LDEV#2 | PAIR STATE | COPY POINTER | TRANSFER MODE |
|---|---|---|---|---|---|---|
| 12345/0000 | ON | 12345/0000 | 54321/bb00 | Duplex | 100%(10000) | SIMPLEX |
| 12345/0001 | ON | 12345/0001 | 54321/bb01 | FORMATION COPYING IN PROGRESS | 10%(1000) | SIMPLEX |
| ... | | ... | | | | |
| 12345/0100 | OFF | 12345/0100 | — | Simplex | — | — |
| 12345/0101 | OFF | 12345/0101 | — | Simplex | — | — |
| ... | | ... | | | | |
| 12345/FFFF | OFF | 12345/FFFF | — | -Simplex | — | — |

COMPUTER SYSTEM AND DATA MIGRATION METHOD

TECHNICAL FIELD

The present invention relates to a computer system which comprises a plurality of storage apparatuses and a host computer which exchanges information with each of the storage apparatuses, and to a data migration method.

BACKGROUND ART

In a computer system, when data of a migration source volume managed by a migration source storage apparatus is migrated to a migration destination volume managed by a migration destination storage apparatus, a first access path linking the host computer to the migration source volume is switched to a second access path linking the host computer to the migration destination volume after the data has been migrated from the migration source volume to the migration destination volume. Here, according to the prior art, when the switch is made from the first access path to the second access path, temporary suspension of host access in which the host computer accesses the migration source volume or migration destination volume is unavoidable. The following two points may be given as reasons for why this is the case.

First, the migration source volume and migration destination volume each have different device manufacturing numbers and other configuration information, and therefore, following migration from the migration source volume to the migration destination volume, the host computer is required to re-identify the migration destination volume.

Meanwhile, in order to migrate the data of the migration source volume to the migration destination volume while continuing host access, consideration has been given to switching access paths while still continuing host access by configuring a plurality of access paths between the host computer and the migration source volume, configuring a plurality of access paths between the host computer and the migration destination volume, and switching each access path in stages from the migration source volume to the migration destination volume. However, because the access path linking the host computer to the migration source volume and the access path linking the host computer to the migration destination volume are generated in parallel, if write access by the host computer occurs during data migration, only the data of one volume of the migration source volume and migration destination volume is updated and data consistency between the migration source volume and migration destination volume can no longer be maintained.

Methods have therefore been proposed for migrating the data of the migration source volume to the migration destination volume without halting host access (see PTL 1 and PTL 2). According to PTL 1 and PTL 2, the first access path linking the host computer to the migration source volume and the second access path linking the host computer to the migration destination volume are configured as alternate paths and the data of the migration source volume is migrated to the migration destination volume after switching the alternate path from the first access path to the second access path.

At this time, prior to data migration, the first access path is made active and the second access path is placed on standby, and when the alternate path is switched from the first access path to the second access path, the first access path is made active and the second access path is made active, and if the data of the migration source volume is migrated to the migration destination volume after the alternate path has been switched from the first access path to the second access path, the first access path is placed on standby and the second active path is made active. When the first access path and the second access path are placed in an active or standby state, the first access path and second access path are both made active at the stage where the alternate path is migrated from the first access path to the second access path.

Hence, if write access from the host computer to the migration source volume occurs while the alternate path is being switched from the first access path to the second access path, update data is stored in the migration source volume, but if write access to the migration destination volume by the host computer occurs, the update data is not stored in the migration destination volume, rather, update data is stored only in the migration source volume.

Meanwhile, during data migration, the first access path is on standby and only the second access path is active. In this case, if write access by the host computer to the migration destination volume occurs, in PTL 1, the write data is merged with the data which is read from the migration source volume and the merged data is written.

Meanwhile, according to PTL 2, if write access to the migration destination volume by the host computer occurs, update data is always stored in the migration destination volume and update data is also stored in the migration source volume. In this case, in order to duplex the data, the end of processing is reported to the host computer after the update data has been written to the migration destination cache memory and then the update data is copied to the migration source volume.

CITATION LIST

Patent Literature

PTL 1: Japanese Published Unexamined Application No. 2005-202495

PTL 2: Japanese Published Unexamined Application No. 2004-220450

SUMMARY OF INVENTION

Technical Problem

Although online volume migration can be executed using the methods disclosed in PTL 1 and PTL 2, the following problems exist.

(1) Since placing an alternate path in a standby state is an impossible notion in a computer system in which the host computer is configured from a mainframe, the methods disclosed in PTL 1 and PTL 2 cannot be applied as is.

(2) If a fault occurs during data migration and data migration processing is suspended, the latest data is not stored in the migration source volume and the migration destination volume respectively and the latest data cannot be restored regardless of which volume data is used.

For example, in PTL 1, after the update data has been stored in the migration destination volume, the update data is merged with the data which is read from the migration source volume and the merged data is stored in the migration destination volume, and hence if a fault occurs during data migration and the data migration processing ends midway through, the latest data cannot be stored in either volume.

Further, in PTL 2, after update data is stored in the cache memory of the migration destination storage apparatus during data migration, if a fault occurs while the update data is being copied to the migration source volume and the data migration processing is suspended, there is no consistency between the data stored in the migration source volume and the data stored in the migration destination volume, and the data which is stored in each volume cannot be guaranteed as being the latest data.

(3) The access path involved in the data migration is only the second access path linking the host computer and the migration destination volume, and hence host access cannot be continued at the moment where a path fault arises in the first access path or the second access path.

The present invention was conceived in view of the problems of the prior art and an object thereof is to provide a computer system and a data migration method which enable host access to be continued and data of a migration source volume to be held as the latest data even when a fault occurs in either the first access path linking the host computer to the migration source volume or the second access path linking the host computer to the migration destination volume.

Solution to Problem

In order to solve the foregoing problem, the present invention is devised such that, in a case where a first access path linking the host computer to the migration source volume and a second access path linking the host computer to the migration destination volume are each online and where the migration destination volume is virtualized as the migration source volume, the host computer manages each of the first access path and the second access path as alternate paths for accessing the migration source volume, wherein, in a case where a first write command is received from the host computer via the first access path during the period up until the first access path is offline after formation copy processing to migrate data of the migration source volume to the migration destination volume via the storage path has ended, the migration source controller writes first update data to the migration source volume, wherein, in a case where a second write command is received from the host computer via the second access path during the period up until the first access path is offline after formation copy processing has ended, the migration destination controller transfers second update data to the migration source controller via the storage path, and, upon receiving the second update data from the migration destination controller, the migration source controller writes the received second update data to the migration source volume.

Advantageous Effects of Invention

The present invention enables host access to be continued and data of a migration source volume to be held as the latest data even when a fault is generated in any the first access path linking the host computer to the migration source volume or the second access path linking the host computer to the migration destination volume.

BRIEF DESCRIPTION OF DRAWINGS

FIG. 8 is a configuration diagram of a virtual device management table.

DESCRIPTION OF EMBODIMENTS

Figure 1:
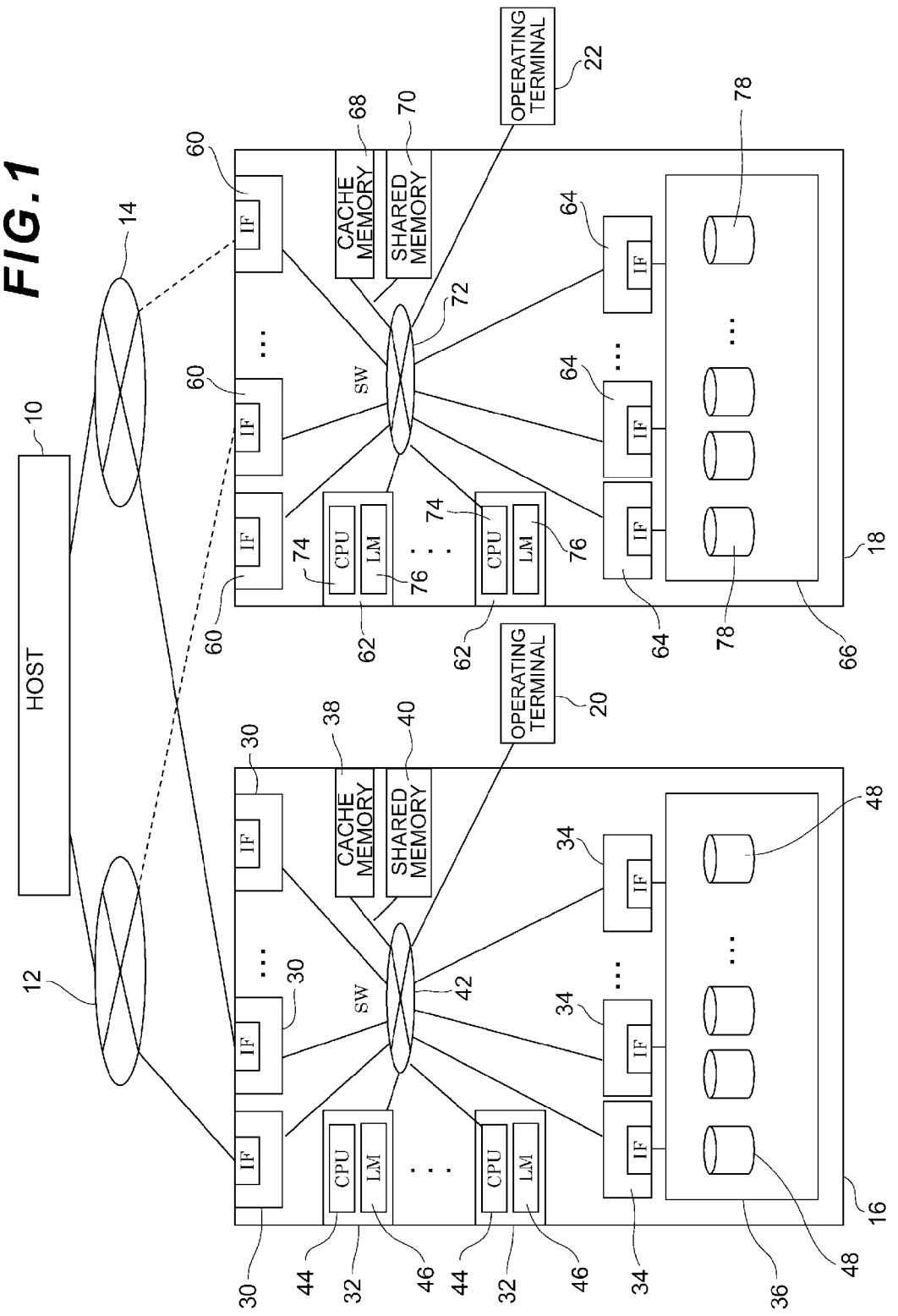
FIG. 1 is a configuration diagram showing the whole configuration of a computer system according to the present invention.

An embodiment of the present invention will be described hereinbelow on the basis of the drawings. FIG. 1 is a configuration diagram of a computer system showing an embodiment of the present invention. In FIG. 1, the computer system is configured from a host computer (hereinafter sometimes called the host) 10, networks 12 and 14, a plurality of storage apparatuses 16, 18, and a plurality of operating terminals 20, 22.

The host 10 is connected to the storage apparatuses 16, 18 via the networks 12, 14. The host 10 is a computer device which comprises information processing resources such as a CPU (Central Processing Unit), a memory, and an I/O interface, for example, and is configured as a personal computer, a workstation, or a mainframe.

The I/O interface of the host 10 comprises a plurality of host ports and each host port is connected to the network 12 or the network 14. The host 10 is able to access a designated logical volume by issuing an access request (command) which designates a logical volume which is provided by the storage apparatus 16, 18, such as a write request (write command) or a read request (read command), to the storage apparatuses 16, 18, for example. Here, as information for specifying the logical volume, a LUN (Logical Unit Number) and an LBA (Logical Block Address) can be appended to the access request.

As the networks 12 and 14, a SAN (Storage Area Network), LAN (Local Area Network), the Internet, a dedicated line, or a public line or the like, for example, can also be used.

In addition, a switch can also be used in place of the switches 12 and 14.

The storage apparatus 16 is configured from a plurality of channel adapters 30, a plurality of control units 32, a plurality of disk adapters 34, a storage unit 36, a cache memory 38, a shared memory 40, and a switch 42, and is managed as a migration source storage apparatus, for example. The control units 32 are each configured from a CPU 44 and a local memory 46 which stores processing programs of the CPU 44, and the storage unit 36 is configured from a plurality of storage media 48.

Here, any one CPU 44 of the plurality of CPU 44 functions as a migration source controller which centrally controls the whole storage apparatus 16 if the storage apparatus 16 is managed as the migration source storage apparatus, for example, executes processing of data I/Os to and from a migration source volume (logical volume which is constructed in a storage area of the storage device 48) based on a command from the host 10, and executes formation copy processing (processing to copy data which is stored in the migration source volume to a migration destination volume which is configured by a storage device 78) and update copy processing (processing to copy update data which is stored in the migration source volume to the migration destination volume), or the like.

The channel adapters 30 are each connected to the host 10 via the networks 12, 14 and are connected, via the switch 42, to the control units 32, the disk adapters 34, the operating terminal 20, the cache memory 38, and the shared memory 40. The channel adapters 30 each comprise a plurality of storage ports which are connected to the network 12 or the network 14, and each function as an interface unit which exchanges information with the host 10 via the networks 12, 14 and performs processing of data I/Os to and from the host 10.

The disk adapters 34 each function as an interface unit which exchanges information with the storage unit 36 and performs processing of data I/Os to and from each of the disk devices 48 in the storage unit 36.

The storage apparatus 18 is a storage apparatus which comprises the same functions as the storage apparatus 16, is configured from a plurality of channel adapters 60, a plurality of control units 62, a plurality of disk adapters 64, a storage unit 66, a cache memory 68, a shared memory 70, and a switch 72, and is managed as a migration destination storage apparatus, for example. The control units 62 are each configured from a CPU 74, and a local memory 76 which stores processing programs and the like of the CPU 74, and the storage unit 66 is configured from a plurality of storage media 78.

Here, one CPU 74 of the plurality of CPU 74 functions as a migration destination controller which centrally controls the whole of the storage apparatus 18 if the storage apparatus 18 is managed as the migration destination storage apparatus, executes processing of data I/Os to and from a migration destination volume (logical volume which is constructed in a storage area of the storage device 48) based on a command from the host 10, and executes processing to convert frames which are appended to commands, or the like.

Possible devices for the storage media 48, 78 include, for example, hard disk drives (HDD), semiconductor memory devices, optical disk devices, opto-electrical disk devices, magnetic tape devices, and flexible disk devices, and the storage devices are devices to and from which data can be written/read.

If hard disk devices are used as the storage devices, SCSI (Small Computer System Interface) disks, SATA (Serial ATA) disks, ATA (AT Attachment) disks, and SAS (Serial Attached SCSI) disks or the like, for example, can be used.

If semiconductor memory devices are used as the storage devices, SSD (Solid State Drive) (flash memory), FeRAM (Ferroelectric Random Access Memory), MRAM (Magnetoresistive Random Access Memory), Ovonic Unified Memory, and RRAM (Resistance Random Access Memory) or the like, can be used.

Further, RAID (Redundant Array of Inexpensive Disks) groups, namely, RAID4, RAID5, and RAID6 or the like, for example, are formed by each of the storage devices 48, 78, and the storage devices 48, 78 can also each be divided into a plurality of RAID groups.

Here, a plurality of logical units (hereinafter may be called LU (Logical Units)) and a plurality of logical volumes can also be formed in the physical storage areas of each of the storage devices 48, 78.

The operating terminals 20, 22 are computer devices which comprise information processing resources such as a CPU, memory, and an I/O interface, for example. Here, the CPU is configured as a service processor.

When a computer system is constructed, the storage apparatuses 16, 18 can also each be directly connected to the host 10, without using the networks 12, 14.

Figure 2:
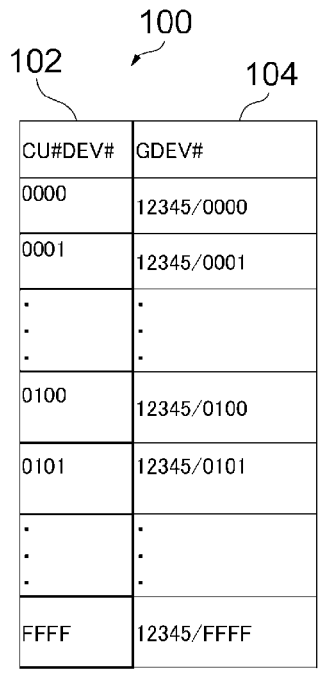
FIG. 2 is a configuration diagram of a host access device/virtual device conversion table.

FIG. 2 is a configuration diagram of a host access device/virtual device conversion table. In FIG. 2, the host access device/virtual device conversion table (hereinafter may be called the conversion table) 100 is a table which is stored in the shared memory 40, 70 of the storage apparatuses 16, 18, and is a table for converting host access device numbers, which are appended to the commands from the host 10, into virtual device numbers. The conversion table 100 is created in port units of each of the storage apparatuses 16, 18. Here, for example, if the storage apparatuses 16, 18 are each configured by 256 control units, conversion tables 100 in a quantity corresponding to 256 control units are created in port units when a new storage apparatus is introduced.

The conversion table 100 is configured from a CU#DEV# field 102 and a GDEV# field 104. The CU#DEV# is a host access device number and is information which indicates the numbers (CU#) specifying each of the control units and the numbers (DEV#) of the volumes disposed in each of the control units. The entry in the CU#DEV# field 102 stores "00", for example, as the number specifying the control unit and stores "01" as the number of the volume disposed in the control unit.

The GDEV (Global Device) is a virtual device which virtualizes, as the same device, physical devices spanning a plurality of storage devices 48 or 78. The GDEV# is information indicating the storage manufacturing number (DKC manufacturing number) specifying the manufacturing number of the storage medium 48 or 78, and the number (LDEV#) specifying the logical volume (LDEV) configured by the storage medium 48 or 78. The entry of the GDEV# field 104 stores "12345", for example, as the storage manufacturing number (DKC manufacturing number) specifying the manufacturing number of the storage medium 48 or 78, and stores "0001" as the number (LDEV#) specifying the LDEV.

Figure 3:
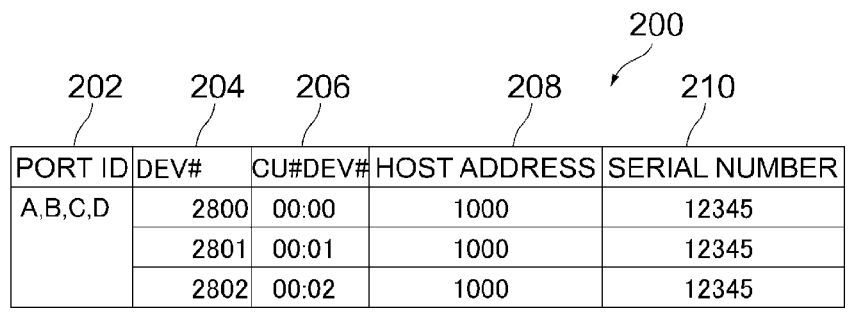
FIG. 3 is a configuration diagram of generation information.

FIG. 3 is a configuration diagram of generation information. In FIG. 3, the generation information 200 is information which is managed by the host 100 and is configured from a port ID 202, a DEV#204, a CU#DEV#206, a host address 208, and a serial number 210.

The port ID 202 is an identifier for identifying the host port comprising the access path for accessing the migration source volume or is an identifier for identifying the host port comprising the access path for accessing the migration destination volume.

The DEV#204 is the number of the volume managed by the host 10. The CU#DEV#206 is information which is obtained from the conversion table 100 and which indicates the number (CU#) specifying each control unit and the number (DEV#) of the volume disposed in each control unit. The host address 208 is the address of the host 10. The serial number 210 is the storage manufacturing number of the volume disposed in each control unit.

Figure 4:
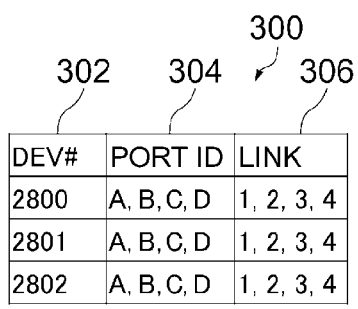
FIG. 4 is a configuration diagram of link information.

FIG. 4 is a configuration diagram of link information. In FIG. 4, the link information 300 is information which is managed by the host 10 and which is configured from a DEV#302, a port ID 304, and a link 306. The DEV#302 is the number of the volume managed by the host 10. The port ID 304 is an identifier for identifying the host port. The link 306 is the number of the storage port indicating the connection destination of the host port.

Figure 5:
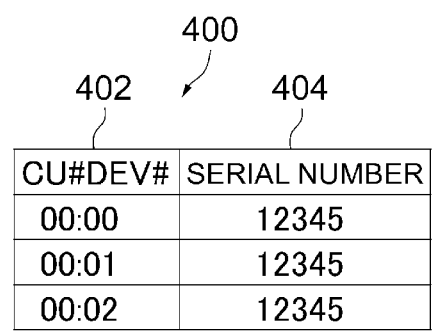
FIG. 5 is a configuration diagram of real volume configuration information.

FIG. 5 is a configuration diagram of real volume configuration information. In FIG. 5, the real volume configuration information 400 is information which is managed by each of the storage apparatuses 16, 18 and which is configured from a CU#DEV#402 and a serial number 404. The CU#DEV#402 is information which indicates the number (CU#) specifying each control unit and the number (DEV#) of the volume disposed in each control unit. The serial number 404 is a storage manufacturing number of the real volume which comprises the migration source volume or migration destination volume (real volume configured from the storage device 48, 78) and which is a volume disposed in each control unit.

Figure 6:
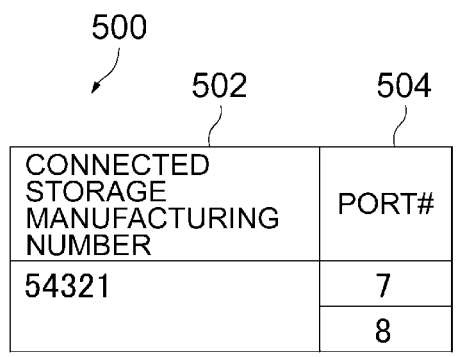
FIG. 6 is a configuration diagram of a storage connection path table.

FIG. 6 is a configuration diagram of a storage connection path table. In FIG. 6, the storage connection path table 500 is a table which is managed by each of the storage apparatuses 16, 18 and is configured from a connected storage manufacturing number field 502 and a port# field 504. The connected storage number is information specifying the manufacturing number of the connection destination volume if the migration source volume in the storage apparatus 16 and the migration destination volume in the storage apparatus 18 are connected via a storage path. The port# is a number which specifies a storage port in the current storage apparatus which is a storage port comprising the storage path.

Figure 7:
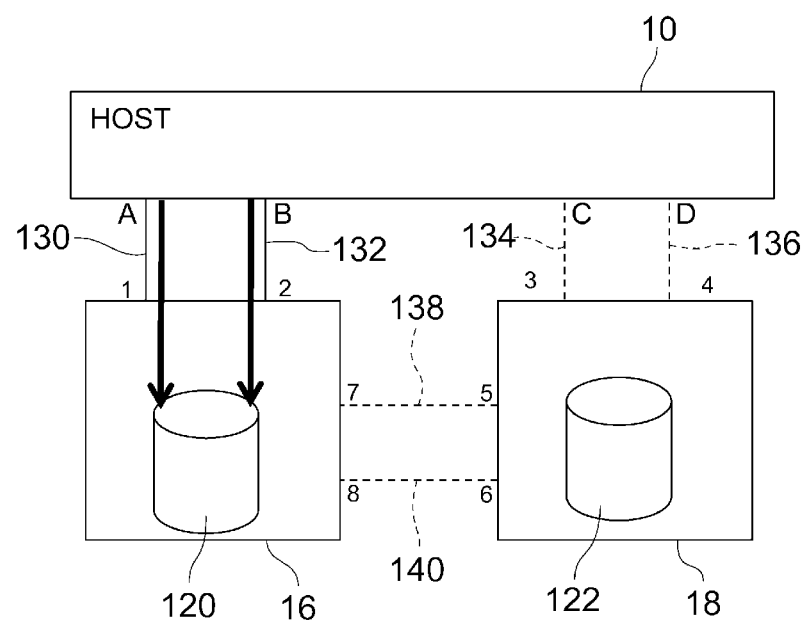
FIG. 7 is a conceptual diagram showing the relationship between access paths and volumes.

FIG. 7 is a conceptual diagram showing the relationship between access paths and volumes. In FIG. 7, if an access path 130 linking a host port A to a storage port 1 and an access path 132 linking a host port B to a storage port 2 are formed as the access path (first access path) linking the host 10 to the migration source volume 120 in the storage apparatus 16 before an alternate path is formed between the host 10 and storage apparatuses 16, 18, the migration source volume 120 is managed as the volume with the CU#DEV# "0001" and the serial number "12345", for example.

If an access path 134 linking a host port C to a storage port 3 and an access path 136 linking a host port D to a storage port 4 are formed as the access path (second access path) linking the host 10 to the migration destination volume 122 of the storage apparatus 18 before an alternate path is formed between the host 10 and storage apparatuses 16, 18, the migration destination volume 122 is managed as the volume with the CU#DEV# "bb01" and the serial number "54321", for example.

If the storage ports 7, 8 of the storage apparatus 16 and the storage ports 5, 6 of the storage apparatus 18 are connected via the storage paths 138, 140, the connected storage manufacturing number field 502 in the storage connection path table 500 managed by the storage apparatus 16 stores "54321," and the port#504 stores "7,8."Further, the connected storage manufacturing number field 502 in the storage connection path table 500 managed by the storage apparatus 18 stores "12345," and the port#504 stores "5,6." In this case, the CPU 44 is able to execute a formation copy which copies data of the migration source volume 120 to the migration destination volume 122 via the storage paths 138, 140, and is able to execute an update copy which copies update data of the migration source volume 120 to the migration destination volume 122 via the storage paths 138, 140.

Meanwhile, if four alternate paths are formed between the host 10 and the storage apparatuses 16, 18, for example, if the access paths 134, 136 are formed in addition to the access paths 130, 132 as the access paths enabling the host 10 to access the migration source volume 120, that is, if the migration destination volume 122 is virtualized as the migration source volume 120, the access paths 130, 132, 134, and 136 are managed as alternate paths for accessing the migration source volume 120. Here, the host 10 is able to access the migration source volume 120 by using any access path among the access paths 130, 132, 134, and 136 by identifying the volume destination volume (a volume with a CU#DEV# "bb01" and a serial number "54321") as the migration source volume (a volume with a CU#DEV# "0001" and a serial number "12345") is a migration destination volume (a volume with a CU#DEV# "bb01" and a serial number "54321").

In this case, the port ID of the generation information 200 in FIG. 3 and the link information 300 in FIG. 4 stores "A, B, C, D" and the link 306 of the link information 300 stores "1, 2, 3, 4."

FIG. 8 is a configuration diagram of a virtual device management table. In FIG. 8, the virtual device management table 600 is a table which is managed by each of the storage apparatuses 16, 18 and is configured from a GDEV# field 602, a duplex attribute field 604, an LDEV#1 field 606, an LDEV#2 field 608, a pair state field 610, a copy counter field 612, and a transfer mode field 614.

The GDEV# is the same as the GDEV# of the conversion table 100. The duplex attribute is information for managing whether there is a need to duplex data between the migration source volume and the migration destination volume in a case where an I/O command (a write command or read command) is issued by the host 10. If data duplexing is required, the duplex attribute field 504 stores "ON" and if data duplexing is not required, the duplex attribute field 504 stores "OFF."

LDEV#1 is information specifying the storage manufacturing number and the LDEV number of the real volume comprising the migration source volume (primary volume).

LDEV#2 is information specifying the storage manufacturing number and the LDEV number of the real volume comprising the migration destination volume (secondary volume).

The pair state is information for managing the state of a pair which is configured from a migration source volume and a migration destination volume and which is a pair that is targeted for volume migration when volume migration is executed. The entry of the pair state field 610 stores either "suspend", "duplex", "formation copying in progress", or "simplex" as information indicating the pair state.

If the pair state is "simplex," only the entry of the LDEV#1 field 606 stores information specifying the storage manufacturing number and the LDEV number of the real volume comprising a migration source volume. If the pair state is a state other than "simplex", the entry of the LDEV#1 field 606 stores information specifying the storage manufacturing number and the LDEV number of the real volume comprising the migration source volume, and the entry of the LDEV#2 field 608 stores information specifying the storage manufacturing number and the LDEV number of the real volume comprising the migration destination volume. Here, the formation copy is executed, the data of the migration source volume is all copied to the migration destination volume and then, if four alternate paths are formed between the host 10 and the migration source volume and migration destination volume, the information which is recorded in the virtual device management table 600 which is managed by each of the storage apparatuses 16, 18 is the same.

Here, in a remote copy which is executed between the storage apparatuses 16, 18, a set of the migration source volume (copy source logical volume) and the migration destination volume (copy destination logical volume) is defined as a pair, the logical volume targeted for access by the host 10, for example, among the logical volumes forming the pair is defined as the migration source volume (primary logical volume) and the logical volume targeted as a migration source volume pair is defined as the migration destination volume (secondary volume).

When a new pair is formed, the formation copy processing is executed. In this case, a migration source volume (copy source) and a migration destination volume (copy destination) are designated as a newly formed pair. At this time, the migration destination volume does not store the same data as the migration source volume and by subsequently executing a formation copy in which the data of the migration source volume is sequentially copied to the migration destination volume, the migration destination volume stores the same data as the migration source volume. The state where a formation copy is being executed is "formation copy in progress."

A state where the data of the migration source volume is copied to the migration destination volume and where the same data is stored in the migration source volume and the migration destination volume, that is, a state where data is duplexed is called a "synchronized" or "duplex" state. When data of the migration source volume is updated in the "synchronized" state, the updated update data is copied to the migration destination volume. This copying is called update copying.

A state where data copying is halted, is a "suspend" state. In the case of a "suspend" state pair, data which differs from the migration source volume is sometimes also stored in the migration destination volume. Hence, differential management using a differential bitmap is executed in a "suspend" state and a "formation copying in progress" state.

The copy counter is information indicating the count value of the copy counter which is managed by the formation copied track number, which is information for managing the progress of formation copying. This information is only valid during formation copying. The entry of the copy counter field 612 stores "10% (1000)" if the progress of the formation copying is 10% of the total, for example.

The transfer mode is a mode for when data is transferred from the migration destination volume to the migration source volume, and the entry of the transfer mode field 614 stores information which specifies any of the transfer modes among the host frame transfer mode, the duplex transfer mode, and the simplex transfer mode. For example, in the case of simplex transfer mode, the entry of the transfer mode field 614 stores "simplex."

The host frame transfer mode is a mode in which, upon receiving an I/O command from the host 10, the migration destination storage apparatus 18 transfers the I/O command received from the host 10 to the migration source storage apparatus 16 as is without processing the frame. In this case, the I/O command which is transferred from the migration destination storage apparatus 18 is identified by the migration source storage apparatus 16 as an I/O command from the host 10 and, in order to store the update data in the migration destination volume after storing the update data appended to the I/O command in the migration source volume, [the storage apparatus 16] performs an update copy and, after the update copy is complete, transmits a completion notification to the migration destination storage apparatus 18.

The duplex transfer mode is a mode in which, upon receiving an I/O command from the host 10, the migration destination storage apparatus 18 temporarily processes the frame of the I/O command received from the host 10 and transfers an I/O command comprising the processed frame to the migration source storage apparatus 16 as a first update copy command. In this case, upon receiving the I/O command comprising the processed frame, the migration source storage apparatus 16 stores the update data which has been appended to the I/O command in the migration source volume and then transfers the update data to the migration destination storage apparatus 18. After carrying out an update copy in which the update data is stored in the migration destination volume, the migration destination storage apparatus 18 issues a completion report to the host 10. In this case, the writing of update data to the migration destination volume is carried out via an update copy.

The simplex transfer mode is a mode in which, upon receiving an I/O command from the host 10, the migration destination storage apparatus 18 temporarily processes the frame of the I/O command received from the host 10 and transfers an I/O command comprising the processed frame to the migration source storage apparatus 16 as a second update copy command, and the update data which has been appended to the received I/O command is held in the storage apparatus 18. Here, after storing the update data which has been appended to the I/O command in the migration source volume, the migration source storage apparatus 16 issues a completion notification to the migration destination storage apparatus 18. After receiving the completion notification, the migration destination storage apparatus 18 stores the update data thus held in the migration destination volume.

Figure 9:
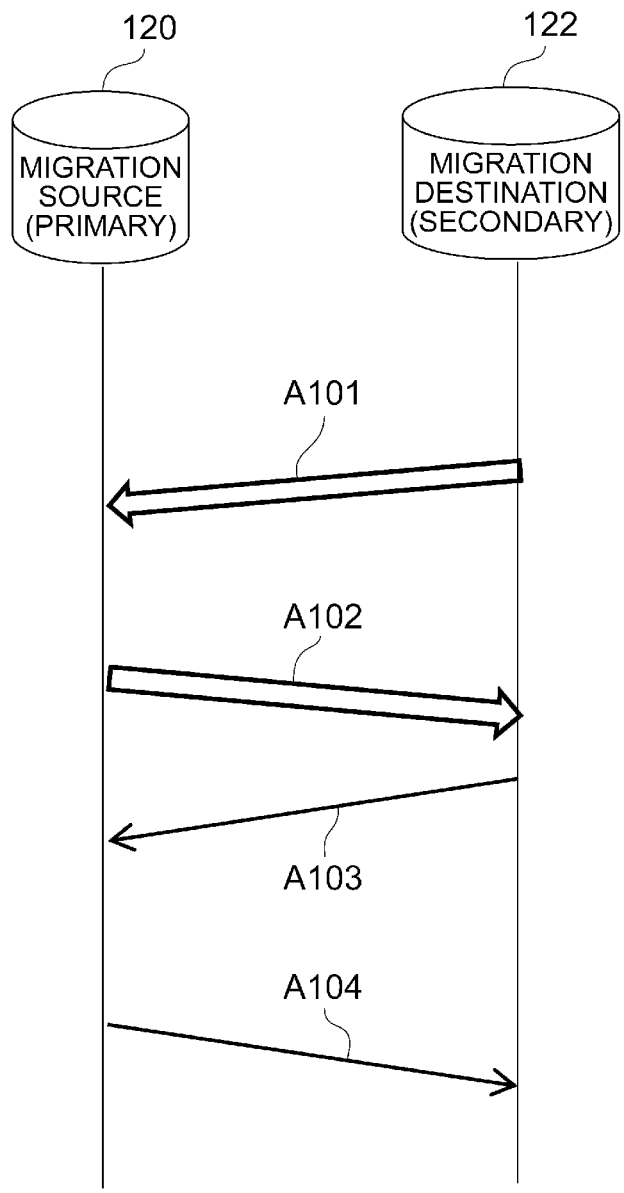
FIG. 9 is a sequence diagram serving to illustrate the operation of a host frame transfer mode or a duplex transfer mode.

FIG. 9 is a sequence diagram serving to illustrate a host frame transfer mode or a duplex transfer mode. In FIG. 9, in a case where a formation copy, in which the data of the migration source volume 120 is copied to the migration destination volume 122 is complete, the access paths 130 to 136 are managed as alternate paths, and, in a case where the CPU 44 of the storage apparatus 16 receives a write command as an I/O command from the host 10 during the period up until the access paths 130, 132 go offline, the CPU 44 stores the update data appended to the write command in the migration source volume 120 and executes an update copy in order to copy the update data stored in the migration source volume 120 to the migration destination volume 122.

In a case where a formation copy, in which the data of the migration source volume 120 is copied to the migration destination volume 122 is complete, the access paths 130 to 136 are managed as alternate paths, the CPU 74 of the storage apparatus 18 receives a write command as an I/O command from the host 10 during the period up until the access paths 130, 132 go offline, and processing of the host frame transfer mode is designated by the received write command, the CPU 74 transfers the received write command as is to the storage apparatus 16. Here, the CPU 44 of the storage apparatus 16 stores the update data appended to the write command in the migration source volume 120 and ends the processing.

Meanwhile, if the processing of the duplex transfer mode is designated by the received write command, the CPU 74 processes the frame of the received write command and transfers the received write command to the storage apparatus 16 as a first update copy command (A101). Upon receiving the first update copy command, the CPU 44 of the storage apparatus 16 stores the update data appended to the first update command to the migration source volume 120 and transfers a command for copying the update data stored in the migration source volume 120 to the migration destination volume 122 to the storage apparatus 18 (A102).

Upon receiving a command from the CPU 44, the CPU 74 stores the update data in the migration destination volume 122 and issues a copy completion notification to the CPU 44 (S103). Upon receiving the copy completion notification, the CPU 44 issues a copy completion notification to the CPU 74 (A104). Upon receiving a command completion notification, the CPU 74 issues an I/O completion notification to the host 10.

Figure 10:
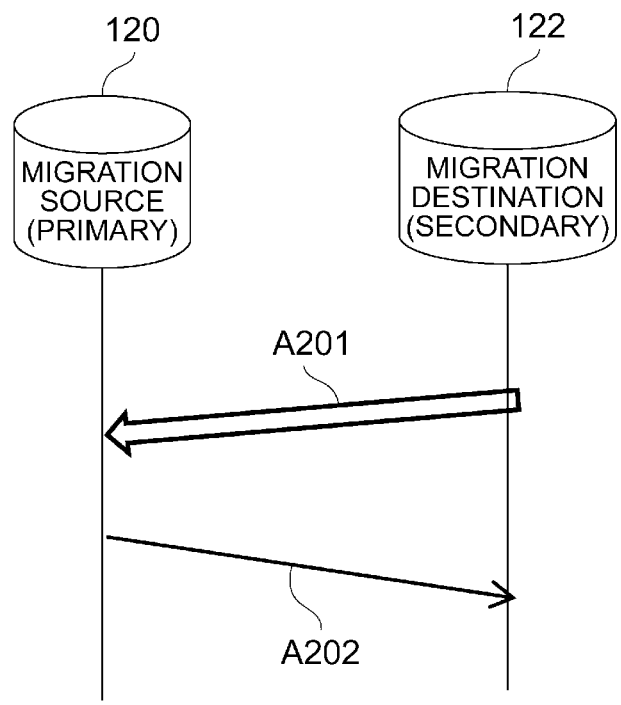
FIG. 10 is a sequence diagram serving to illustrate a simplex transfer mode.

FIG. 10 is a sequence diagram serving to illustrate the simplex transfer mode. In FIG. 10, in a case where a formation copy, in which the data of the migration source volume 120 is copied to the migration destination volume 122 is complete, the access paths 130 to 136 are managed as alternate paths, the CPU 74 of the storage apparatus 18 receives a write command as an I/O command from the host 10 during the period up until the access paths 130, 132 go offline, and processing of the simplex transfer mode is designated by the received write command, the CPU 74 processes the frame of the received write command and transfers the received write command to the storage apparatus 16 as a second update copy command (A201). At this time, the CPU 74 executes update copy processing to copy the update data appended to the write command to the migration source volume 120 and holds the update data which is appended to the write command.

Upon receiving the second update copy command, the CPU 44 of the storage apparatus 16 stores the update data transferred from the CPU 74 in the migration source volume 120 and issues a command completion notification to the CPU 74 (A202). The CPU 74, which receives the command completion notification, stores the update data thus held in the migration destination volume 122 and then issues an I/O completion notification to the host 10.

Figure 11:
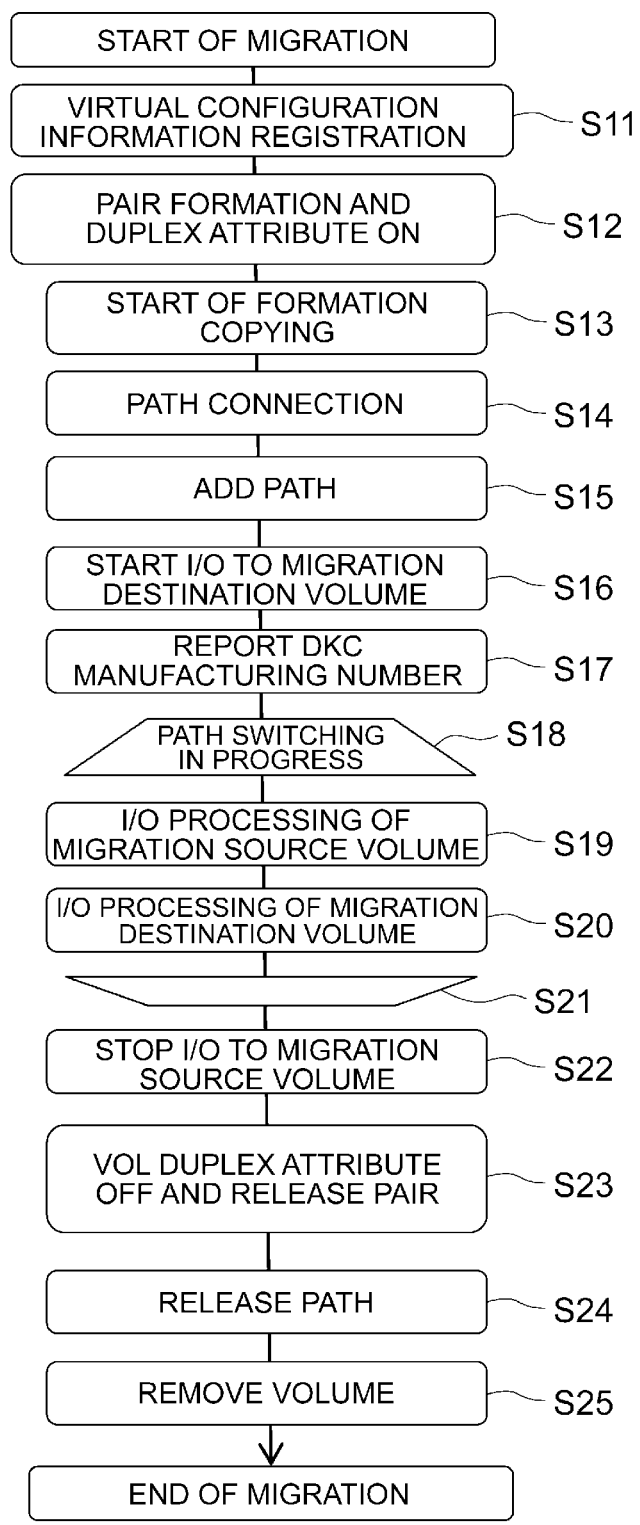
FIG. 11 is a flowchart serving to illustrate migration processing.

FIG. 11 is a flowchart serving to illustrate migration processing. In FIG. 11, when migration for migrating data of the migration source volume to the migration destination volume is started when a new storage apparatus is introduced, registration of the virtual configuration information of the migration destination storage apparatus 18 is executed by any of the service processors among the operating terminals 20, 22 (S11). For example, the configuration information of the migration source storage apparatus 16 is virtualized, in the migration destination storage apparatus 18, as configuration information of the migration destination storage apparatus 18 and the virtualized configuration information is registered in the conversion table 100 and the virtual device management table 600.

Any service processor of the operating terminals 20, 22 selects a migration source volume and a migration destination volume, which are migration targets among the volumes, as a pair, the selected pair is registered in the virtual device management table 600, and a duplex attribute of the migration source volume and the migration destination volume which comprise the pair are configured ON (S12).

The service processor then starts a formation copy between the migration source volume and the migration destination volume which comprise the pair (S13). Accordingly, formation copy processing is executed between the CPU 44 and CPU 74 and data of the migration source volume 120 is copied to the migration destination volume 122 via a storage path. In other words, all the data of the volume is copied from the migration source volume 120 to the migration destination volume 122.

The service processor then performs a path connection for connecting the migration destination volume 122 to the host 10 via an access path (S14). In this case, access paths 134, 136 linking the migration destination volume 122 to the host 10 are formed in addition to the access paths 130, 132 linking the migration source volume 120 to the host 10 (see FIG. 7).

The service processor then adds information relating to the newly added access paths 134, 136 to the generation information 200 and link information 300 (S15). In this case, the service processor adds information relating to the access paths 134, 136 to the generation information 200 and the link information 300 for each control unit. In this case, the port ID 202 of the generation information 200 stores "A, B, C, D" and the link 306 of the link information 300 stores "1, 2, 3, 4." The access paths 130, 132, 134, and 136 are each managed as alternate paths enabling the host 10 to access the migration source volume 120.

I/O command processing between the host 10 and the migration destination volume 122 is started next (S16). At this time, if the migration destination volume 122 is accessed by the IO command from the host 10, the CPU 74 reports the storage manufacturing number and LDEV# of the migration source volume 120 to the host 10 in response to the I/O command (S17). When accessing the migration destination volume 122 via the access path 134 or 136, the host 10 receives the storage manufacturing number and LDEV# of the migration source volume 120 and therefore recognizes the migration destination volume 122 and the migration source volume 120 as the same volume.

Thereafter, the access paths are switched by the service processor from the access paths 130, 132 to the access paths 134, 136 and processing to make the alternate paths only the access paths 134, 136 is executed. Processing by the CPU 44 and CPU 74 is executed during the path switching (steps S18 to S21).

For example, if the CPU 44 receives an I/O command via the access path 130 or 132, the CPU 44 stores the update data appended to the I/O command in the migration source volume 120 and executes update copy processing for writing the update data in duplicate to the migration destination volume 122 (S19). In this case, the CPU 74 stores the update data transferred from the CPU 44 to the migration destination volume 122.

Meanwhile, if the CPU 74 receives an IO command from the access path 134 or 136, the CPU 74 transfers the first update copy command to the CPU 44, for example. The CPU 44 stores the update data appended to the first update copy command in the migration source volume 120 and executes update copy processing to write the update data in duplicate to the migration destination volume 122 (S20). In this case, the CPU 74 stores the update data transferred from the CPU 44 in the migration destination volume 122.

Note that, in step S17, the storage manufacturing number and the logical volume number are reported to the host 10. For example, if "0001" is appended to the command from the host, the information "12345/0001" is reported as response information to the command.

After the path switching ends, the host 10 then stops issuing the I/O command enabling the host 10 to access the migration source volume 120 via the access path 130 or 132 (S22). At the time, the service processor configures the duplex attribute of the virtual device management table 600 to "OFF", releases the pair, and configures the pair state as "Simplex" (S23). In this case, "OFF" is stored in the duplex attribute field 604 in the virtual device management table 600 managed by the migration source storage apparatus 16 and the information of the LDEV#2 field 608 is deleted. "OFF" is stored in the duplex attribute field 604 in the virtual device management table 600 managed by the migration destination storage apparatus 18, and the LDEV#1 field 606 stores information of the manufacturing numbers and LDEV numbers of the logical volumes which are configured from the storage device 78. However, information of the LDEV#2 field 608 is deleted.

The host 10 then deletes paths (access paths) which are configured between the migration source volume 120 and the host 10 from the generation information 200 and the link 300 (S24). As a result, the generation information 200 and link information 300 are thus updated. For example, "A, B" is deleted from the port ID 202 of the generation information 200, "A,B" is deleted from the port ID 304 in the link information 300, and "1,2" is deleted from the link 306. In addition, information of the storage connection path table 500 is deleted.

Thereafter, a storage device 48 comprising the migration source volume 120 is withdrawn (S25) and migration processing ends.

Figure 12:
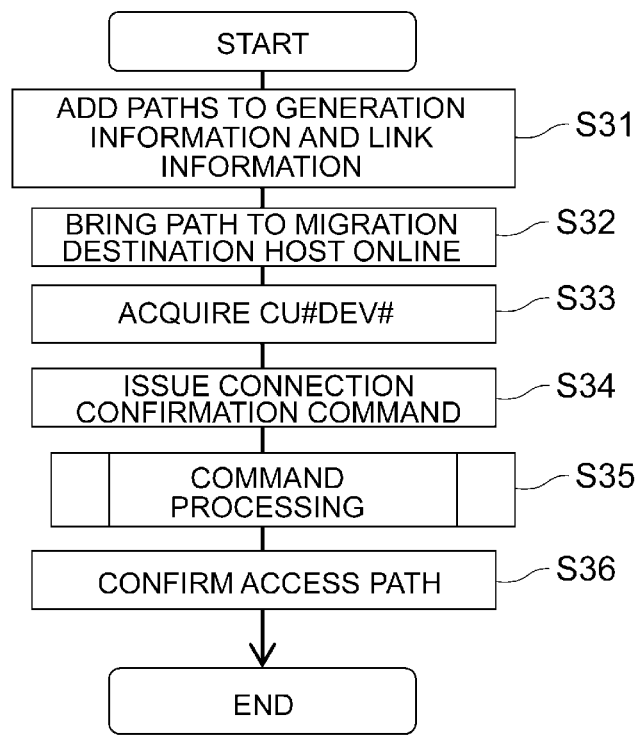
FIG. 12 is a flowchart serving to illustrate processing when a volume is virtualized.

FIG. 12 is a flowchart serving to illustrate processing when the volume is virtualized. In FIG. 12, the host 10 adds the access paths 134, 136, for example, as the paths linking the migration destination volume 122 and the host 10 to the generation information 200 and the link information 300 (S31).

The host 10 then places the access paths 134, 136 linking the migration destination volume 122 to the host 10 in an online state (S32). The host 10 then refers to the generation information 200, acquires the CU#DEV# (S33), and issues a connection confirmation command for confirming the connection of the volume corresponding to the acquired CU#DEV# to the migration destination storage apparatus 18 (S34).

Thereafter, the processing of the connection confirmation command which is issued by the host 10 is executed in the migration destination storage apparatus 18 (S35).

Upon receiving information responding to the connection confirmation command from the migration destination storage apparatus 18, the host 10 then identifies the storage manufacturing number and the LDEV number on the basis of the received information, confirms that the path added in step S31 is an access path defined in the generation information 200 (S36) and ends the processing of this routine.

Figure 13:
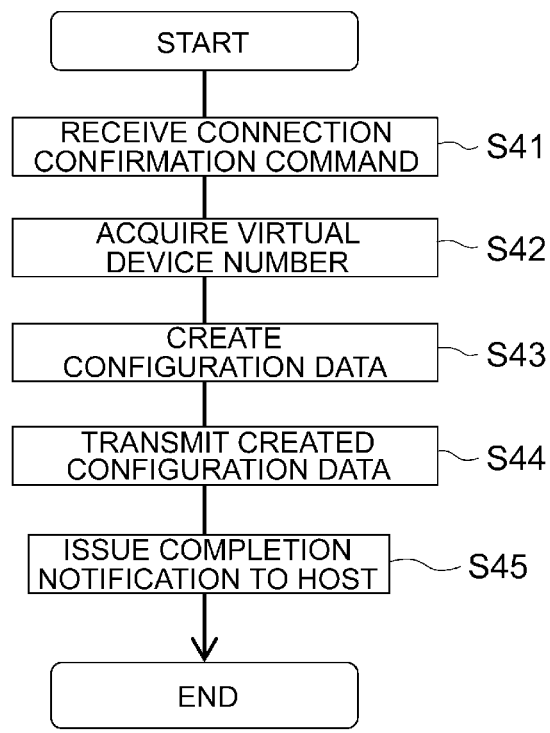
FIG. 13 is a flowchart serving to illustrate command processing.

FIG. 13 is a flowchart serving to illustrate command execution processing in the migration destination storage apparatus. The specific content of this processing is step S35 in FIG. 12 and this processing is executed by the CPU 74 of the migration destination storage apparatus 18. If the connection confirmation command is received from the host 10 (S41), the CPU 74 refers to the conversion table 100 on the basis of the received command, and acquires the virtual device number (GDEV#) corresponding to the host access device number (CU#DEV#) appended to the received command (S42). For example, if "0001" is appended as the CU#DEV# to the received command, the CPU 74 acquires "12345/0001" as the GDEV#.

The CPU 74 then acquires the storage manufacturing number "12345" from the high order byte in the acquired GDEV#, acquires the LDEV# "0001" from the low-order byte, and creates configuration data for reporting the acquired storage manufacturing number "12345" and the LDEV# "0001" to the host 10 (S43).

The CPU 74 then transmits the created configuration data to the host 10 (S44), reports to the host 10 that command execution processing is complete (S45), and ends the processing of this routine.

Figure 14:
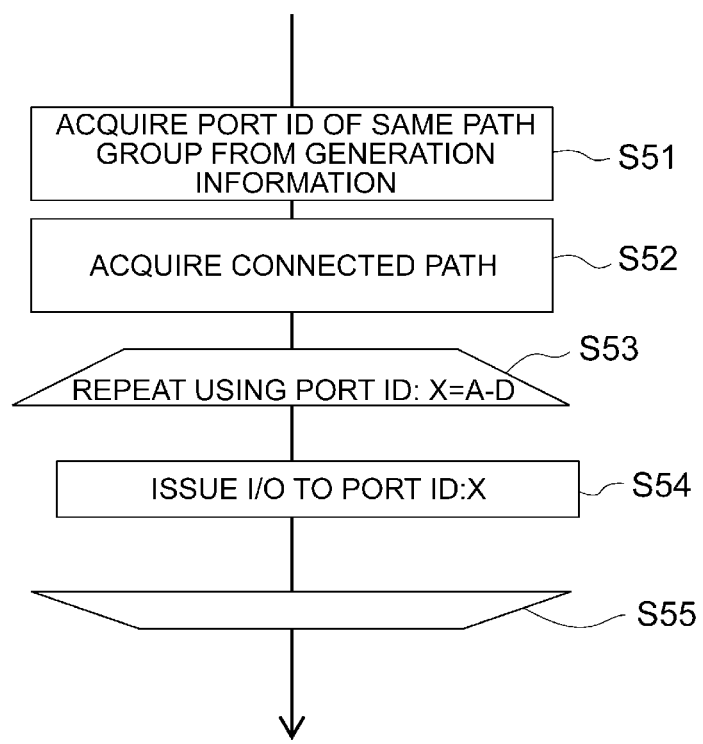
FIG. 14 is a flowchart serving to illustrate I/O issue processing by a host.

FIG. 14 is a flowchart serving to illustrate I/O issue processing by the host. This processing is processing in which the host I/O issues I/Os in round-robbin fashion. First, in the host 10, the CPU refers to the generation information 200, acquires information which is recorded in the port ID 202 of the same path group (S51), refers to the link information 300 on the basis of the acquired information, and acquires a path via enabling I/Os to be issued, that is, a connected path on which the connection destination port is connected to the link 306 (S52). Thereafter, the CPU repeats the processing of steps S53 to S55 and issues I/Os to a port X which is registered in the port ID 202 (S54). For example, if "A, B, C, and D" are registered as the ports in the port ID 202, I/Os are issued sequentially from the registered ports A, B, C, and D.

Figure 15:
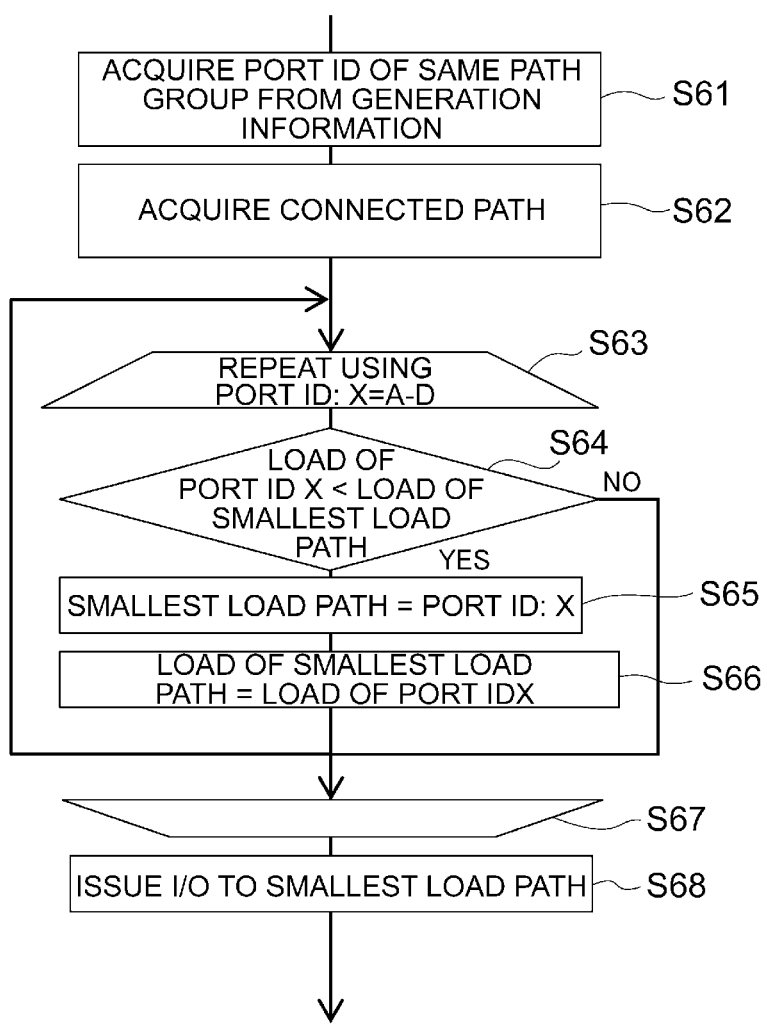
FIG. 15 is a flowchart serving to illustrate I/O issue processing by a host.

FIG. 15 is a flowchart serving to illustrate another processing example of the I/O issue processing by the host. In the host I/O, the CPU refers to the generation information 200 and acquires information which is recorded in the port ID 202 of the same path group (S61), and refers to the link information 300 on the basis of the acquired information to acquire a path enabling I/Os to be issued, that is, a connected path on which the connection destination port is connected to the link 306 (S62).

The CPU subsequently repeats the processing of steps S63 to S67. At this time, the CPU determines whether the load on path X which is connected to the port registered in port ID 202 is less than the load of the smallest load path (S64) and if a negative determination result is obtained in this step, the CPU moves to the processing of step S68, whereas if an affirmative determination result is obtained in step S64, the CPU configures the smallest load path as the path connected to the port which is registered in the port ID 202 (S65).

Thereafter, the CPU configures the load of the smallest load path as the load of the port registered in port ID 202 (S66), issues an I/O to the smallest load path (S68), and ends the processing of this routine.

Figure 16:
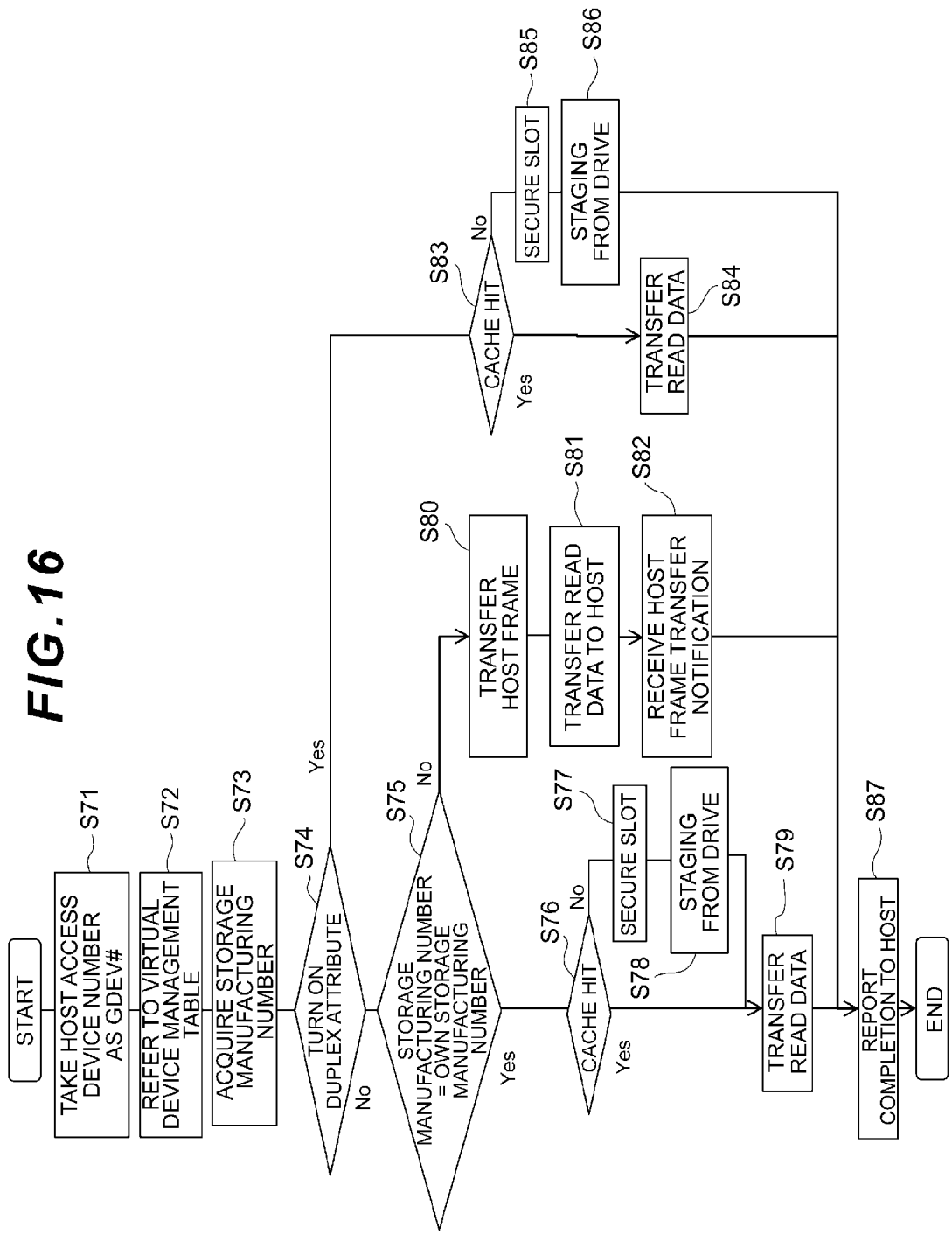
FIG. 16 is a flowchart serving to illustrate read processing.

Next, FIG. 16 is a flowchart serving to illustrate read processing during path switching. This processing is processing which is executed by the CPU 44 or CPU 74. Note that the read processing in each storage apparatus 16, 18 is the same, and hence the processing of CPU 44 is illustrated. First, the CPU 44 refers to the conversion table 100 on the basis of the read command if the read command is received from the host 10, converts the host access device number (CU#DEV#) which has been appended to the read command into a virtual device number (GDEV#) (S71), and refers to the virtual device management table 600 on the basis of the converted virtual device number (S72).

The CPU 44 then acquires the storage manufacturing number of the processing target volume (LDEV#1) from the entry which corresponds to the converted virtual device number (GDEV#) in the virtual device management table 600 (S73) and determines whether the duplex attribute of the processing target volume (LDEV#1) is ON (S74).

If a negative determination result is obtained in step S74, the CPU 44 determines whether the LDEV#1 storage manufacturing number=its own storage manufacturing number (S75).

If an affirmative determination result is obtained in step S75, the CPU 44 determines whether the read data exists in the cache memory 38, that is, whether there is a cache hit (S76). If a negative determination result is obtained in step S76, the CPU 44 secures a slot in the cache memory 38 (S77), executes staging processing for storing the read data thus read from the storage device 48 in the secured slot (S78), and moves to the processing of step S79.

If an affirmative determination result is obtained in step S76 or after the processing of step S78 is complete, the CPU 44 transfers the read data which exists in the cache memory 38 or the read data which is read from the storage device 48 to the host 10 (S79), and moves on to the processing of step S87.

Meanwhile, if a negative determination result is obtained in step S75, that is, if the processing target volume is being managed by the storage apparatus 18, the CPU 44 transfers the received read command to the CPU 74 as a host frame (S80) and, upon receiving read data from the CPU 74, transfers the received read data to the host 10 (S81) and then receives a host frame transfer notification from the CPU 74 (S82), before moving to the processing of step S87.

Furthermore, if the duplex attribute of the processing target volume is ON and an affirmative determination result is obtained in step S74, the CPU 44 determines whether there is a cache hit (S83). If an affirmative determination result is obtained in step S83, the CPU 44 transfers the read data which is stored in the cache memory 38 to the host 10 (S84), and moves on to the processing of step S87.

Meanwhile, if a negative determination result is obtained in step S83, the CPU 44 secures a slot in the cache memory 38 (S85), executes staging processing to store the read data thus read from the storage device 48 in the secured slot (S86), and moves on to the processing of step S87.

The CPU 44 then issues a report to the host 10 to the effect that the read processing is complete (S87) and ends the processing of this routine.

Figure 17:
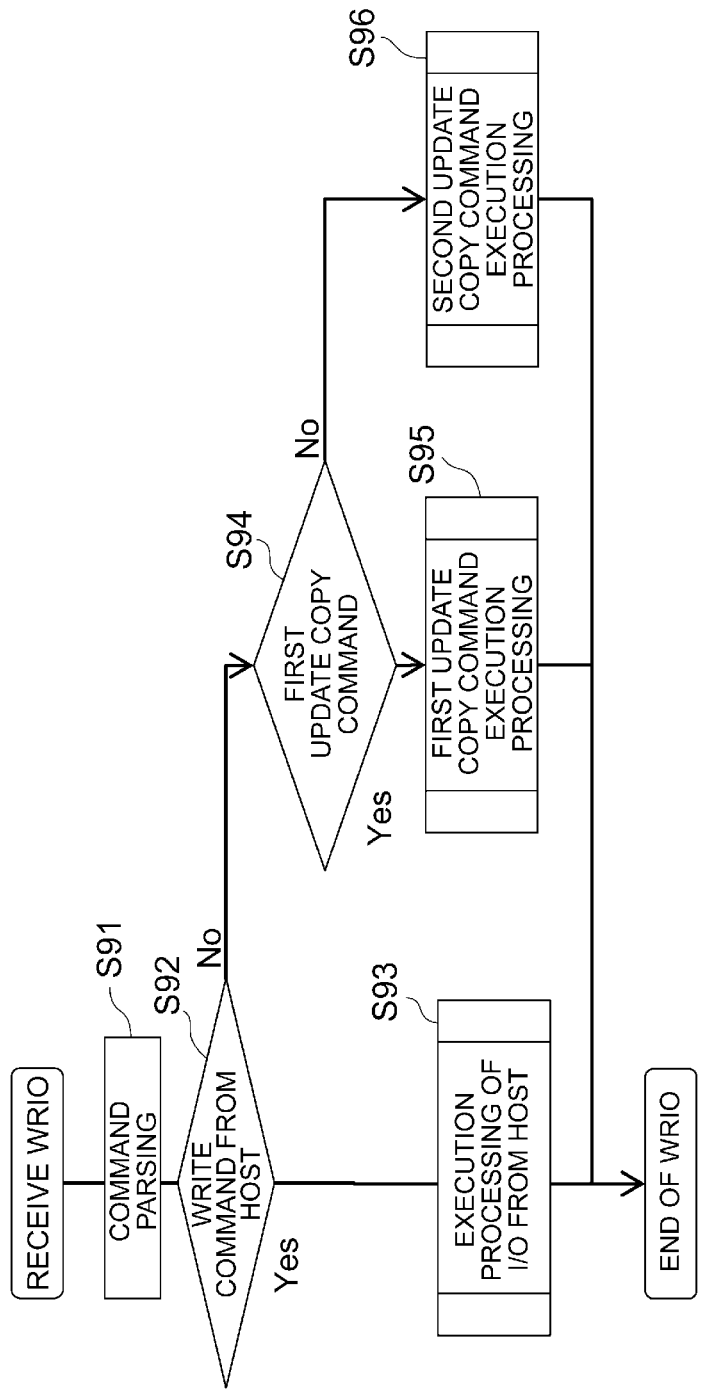
FIG. 17 is a flowchart serving to illustrate write processing during path switching.

FIG. 17 is a flowchart serving to illustrate write processing during path switching. Write processing is executed by the CPU 44 or the CPU 74 but a case will be described where the CPU 44 receives a write command from the host 10.

First, upon receiving a command, the CPU 44 parses the received command (S91) and determines whether the command is a write command from the host 10 (S92). If an affirmative determination result is obtained in step S92, the CPU 44 executes write I/O processing in accordance with the write command from the host 10 (S93) and ends the processing of this routine.

Meanwhile, if a negative determination result is obtained in step S92, the CPU 44 determines whether the received command is a first update copy command (update copy command which is transferred from the CPU 74) (S94).

If an affirmative determination result is obtained in step S94, the CPU 44 executes the processing in accordance with the first update copy command (S95) and ends the processing of this routine. Meanwhile, if a negative determination result is obtained in step S94, that is, if it is determined that the received command is a second update copy command transferred from the CPU 74, the CPU 44 executes processing in accordance with the second update copy command (S96) and ends the processing of this routine.

Figure 18:
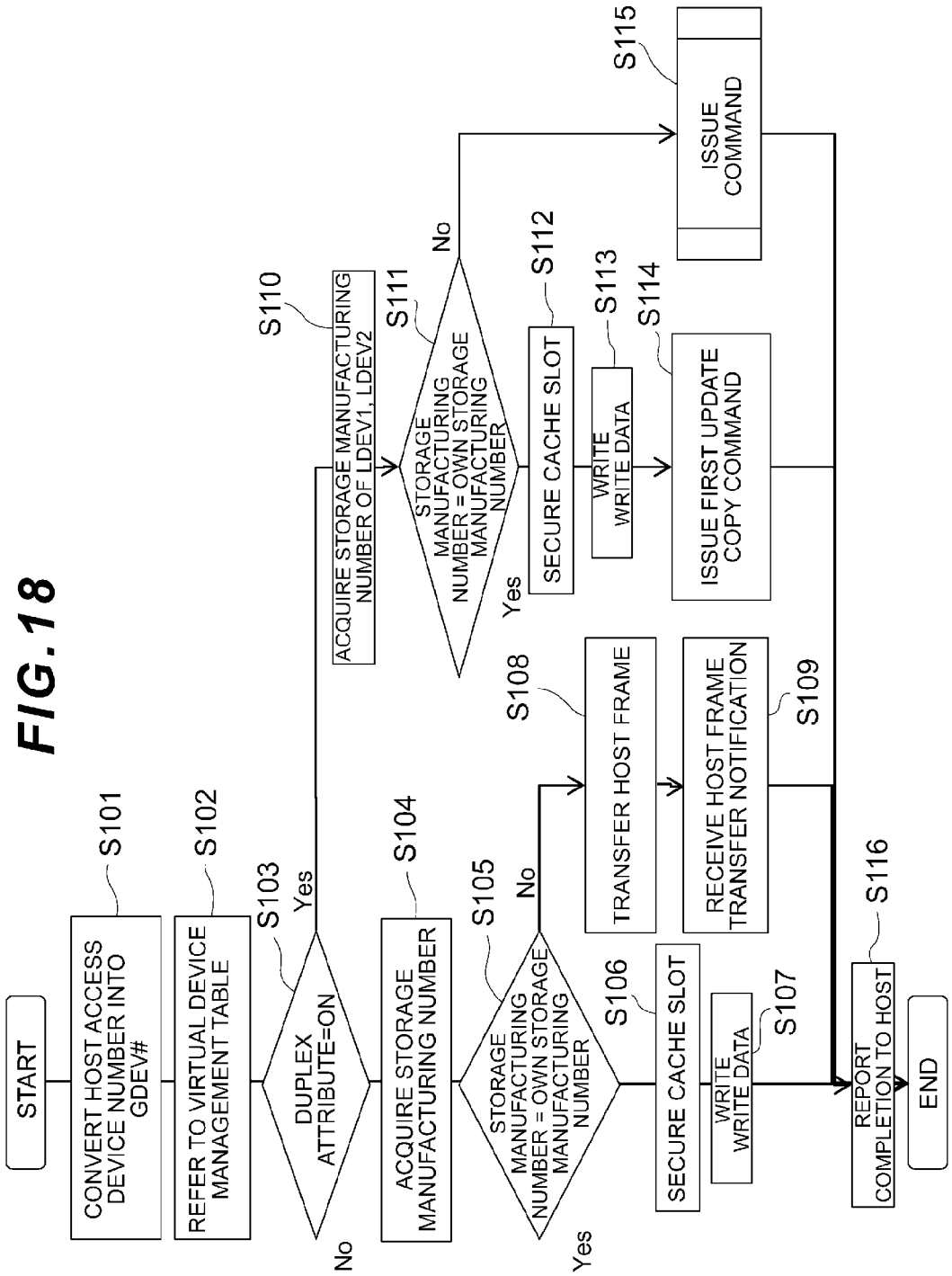
FIG. 18 is a flowchart serving to illustrate I/O execution processing.

FIG. 18 is a flowchart serving to illustrate I/O execution processing. The specific content of this processing is step S93 in FIG. 17.

If the CPU 44 or CPU 74 receives a write command from the host 10, for example, if the CPU 44 receives a write command from the host 10, the CPU 44 refers to the conversion table 100 on the basis of the write command, converts the host access device number (CU#DEV#) appended to the write command into a virtual device number (GDEV#) (S101), and refers to the virtual device management table 600 on the basis of the converted virtual device number (S102).

The CPU 44 then refers to the entry corresponding to the converted virtual device number (GDEV#) in the virtual device management table 600 to determine whether the duplex attribute of the processing target volume (LDEV#1) is ON (S103).

In a case where a negative determination result is obtained in step S103, that is, where the duplex attribute of the processing target volume (LDEV#1) is OFF, the CPU 44 acquires the storage manufacturing number of the processing target volume (LDEV#1) (S104), and determines whether the LDEV#1 storage manufacturing number=its own storage manufacturing number (S105).

If an affirmative determination result is obtained in step S105, the CPU 44 secures a slot in the cache memory 38 (S106), writes the write data appended to the write command in the secured slot (S107), and moves on to the processing of step S116. Note that the CPU 44 writes the write data which is stored in the cache memory 38 to the LDEV#1 which is the migration source volume after reporting completion to the host 10 in step S116.

Meanwhile, if a negative determination result is obtained in step S105, that is, if the processing target volume is being managed by the storage apparatus 18, the CPU 44 transfers the received write command to the CPU 74 as the host frame (S108) and then receives a host frame transfer notification from the CPU 74 (S109) before moving on to the processing of step S116.

Further, if the duplex attribute of the processing target volume is ON and an affirmative determination result is obtained in step S103, the CPU 44 refers to the virtual device management table 600, acquires the storage manufacturing numbers of LDEV#1 and LDEV#2 as the storage manufacturing numbers of the volumes forming the pair (S110), and determines whether or not the storage manufacturing number of the LDEV#1=its own storage manufacturing number (S111).

If an affirmative determination result is obtained in step S111, the CPU 44 secures a slot in the cache memory 38 (S112), writes write data which is appended to the write command to the secured slot (S113), issues the first update copy command to the CPU 74 (S114) and moves on to the processing of step S116. In this case, the CPU 74 writes write data to the LDEV#2 which is the migration destination volume.

Meanwhile, if a negative determination result is obtained in step S111, that is, if the CPU 74 receives a write command from the host 10, the CPU 74 executes processing to issue a command to the CPU 44 (S115), and moves on to the processing of step S116.

The CPU 44 or CPU 74 then issues a report to the host 10 to the effect that write I/O processing is complete (S116) and ends the processing of this routine.

Figure 19:
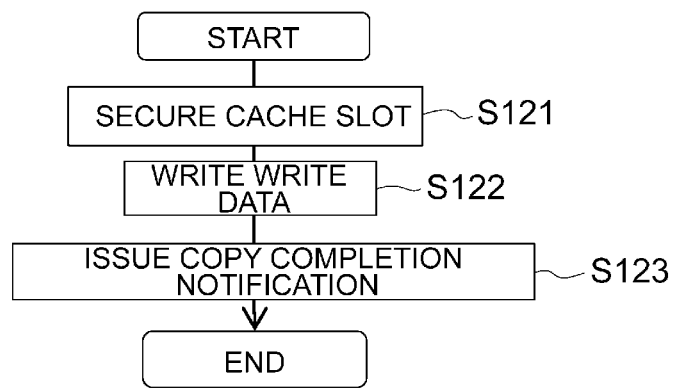
FIG. 19 is a flowchart serving to illustrate first copy command execution processing.

FIG. 19 is a flowchart serving to illustrate first update copy command execution processing. The specific content of this processing is step S95 in FIG. 17. First, upon receiving the first update copy command from the CPU 74, the CPU 44 stores update data in the migration source volume 120 and then, in order to carry out an update copy, transfers the update copy command to the CPU 74.

If an update copy command is received, the CPU 74 secures a slot in the cache memory 68 (S121) and writes write data which is appended to the update copy command to the secured slot (S122).

The CPU 74 then issues a copy completion notification to the CPU 44 (S123) and ends the processing of this routine.

Figure 20:
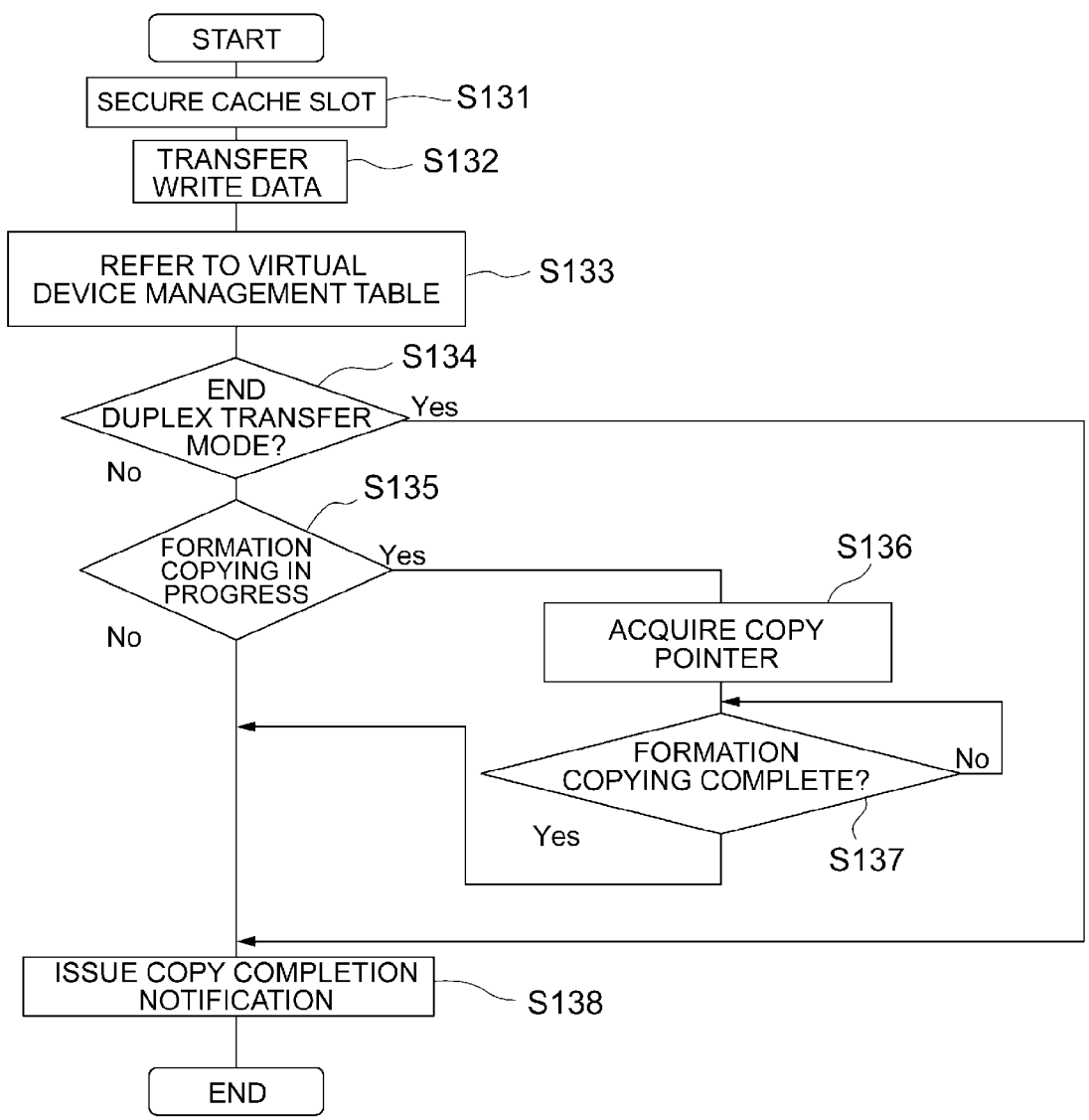
FIG. 20 is a flowchart serving to illustrate second update copy command execution processing.

FIG. 20 is a flowchart serving to illustrate second update copy command execution processing. The specific content of this processing is step S96 of FIG. 17.

First, upon receiving a write command from the host 10, the CPU 74 holds the write data which is appended to the write command and transfers the second update copy command to the CPU 44.

Upon receiving the second update copy command from the CPU 74, the CPU 44 secures a slot in the cache memory 38 (S131), writes write data to the secured slot (S132), refers to the virtual device management table 600 on the basis of the second update copy command (S133) and determines whether or not the processing of the duplex transfer mode is complete (S134).

If an affirmative determination result is obtained in step S134, the CPU 44 moves on to the processing of step S138. If, on the other hand, a negative determination result is obtained in step S135, the CPU 44 refers to the virtual device management table 600 to determine whether or not formation copying is in progress (S135).

If an affirmative determination result is obtained in step S135, the CPU 44 refers to the virtual device management table 600, acquires the value of the copy pointer (S136), and determines whether or not the state of the track specified by the access track number is formation copied (S137).

If a negative determination result is obtained in step S137, the CPU 44 executes the processing of step S137 until the state of the track specified by the access track number is formation copied.

If a negative determination result is obtained in step S135 or if an affirmative determination result is obtained in step S137, that is, formation copy is complete, the CPU 44 issues a copy completion notification to the CPU 74 (S138) and ends the processing of this routine.

Figure 21:
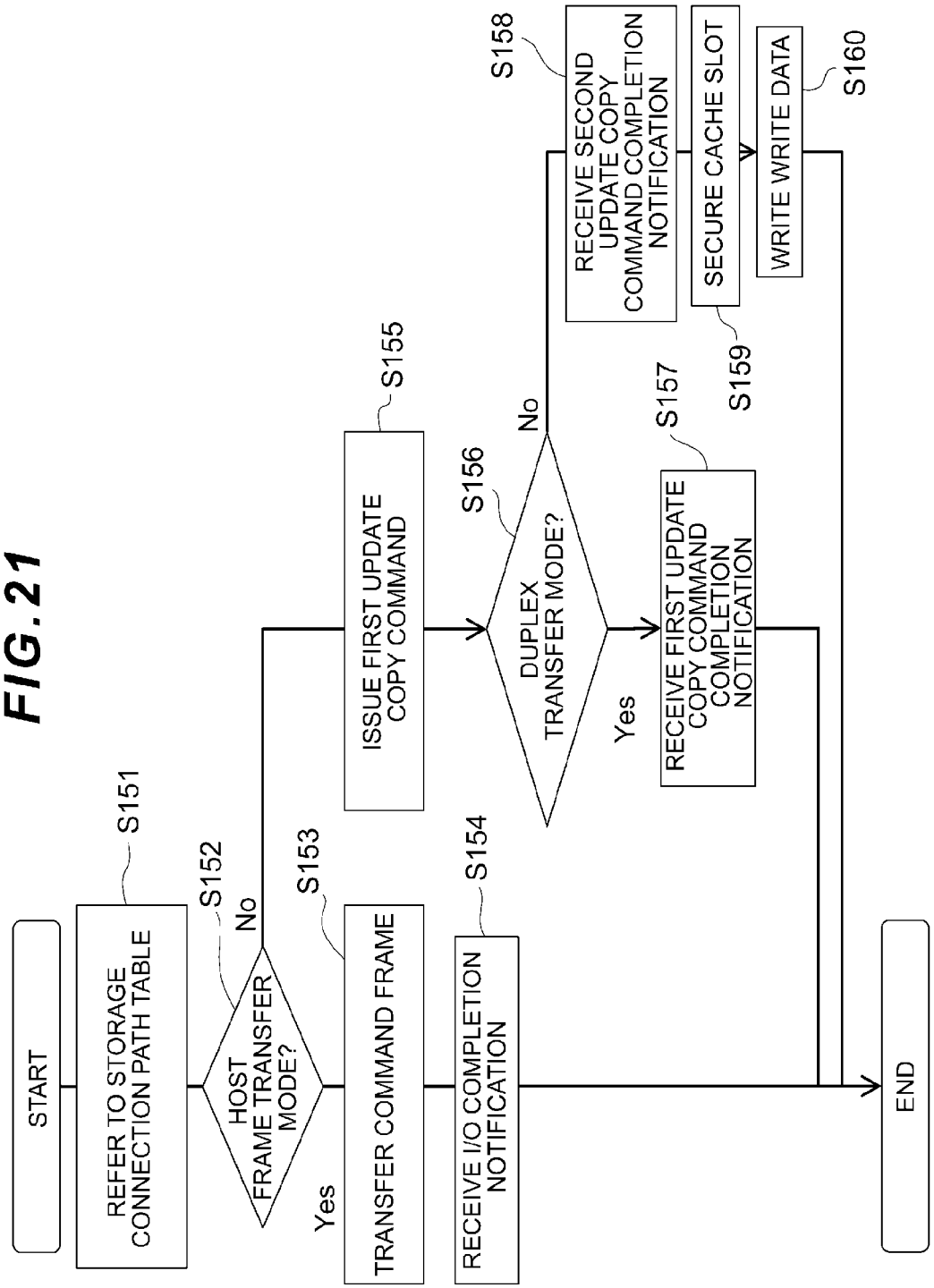
FIG. 21 is a flowchart serving to illustrate processing to issue an I/O to a migration source volume.

FIG. 21 is a flowchart serving to illustrate I/O issue processing to the migration source volume. The specific content of this processing is step S115 of FIG. 18.

The CPU 74 refers to the storage connection path table 500 on the basis of the write command from the host 10, acquires the port connected to the LDEV#1 (S151), and refers to the virtual device management table 600 to determine whether or not the transfer mode is a host frame transfer mode (S152).

If an affirmative determination result is obtained in step S152, the CPU 74 transfers the write command from the host 10 to the CPU 44 via the storage path as is as a command frame (S153), and then receives an I/O completion report from the CPU 44 (S154) and ends the processing of this routine.

If, on the other hand, a negative determination result is obtained in step S152, that is, if the transfer mode is simplex transfer mode or duplex transfer mode, the CPU 74 issues the first update copy command to the CPU 44 (S155), and then refers to the virtual device management table 600 and determines whether or not the transfer mode is duplex transfer mode (S156).

If an affirmative determination result is obtained in step S156, the CPU 74 receives the first update copy command completion notification from the CPU 44 (S157) and ends the processing of this routine.

If, on the other hand, a negative determination result is obtained in step S156, the CPU 74 receives a second update copy command completion notification from the CPU 44 (S158) and then secures a slot in the cache memory 68 (S159), writes the write data appended to the write command in the secured slot (S160), and ends the processing of this routine.

Figure 22:
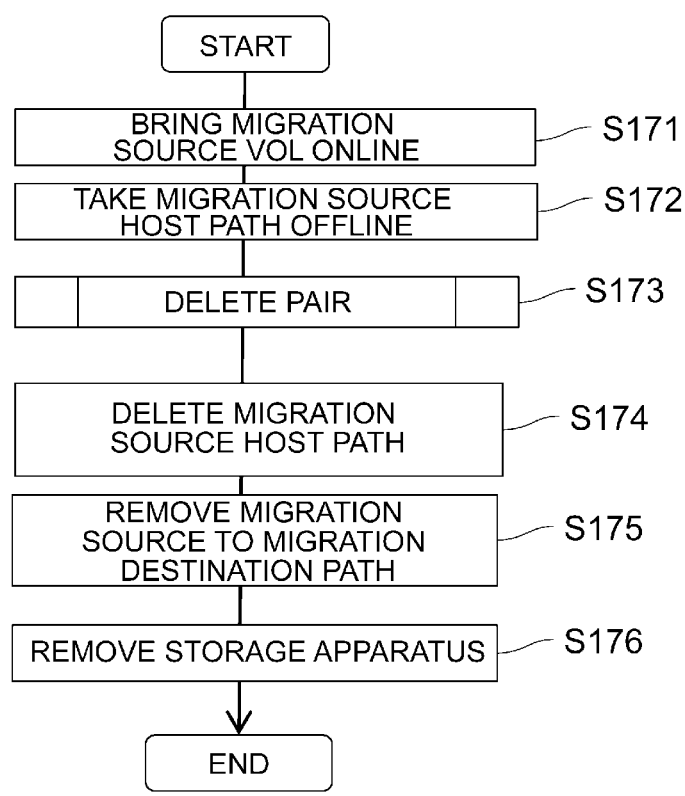
FIG. 22 is a flowchart serving to illustrate storage release processing.

FIG. 22 is a flowchart serving to illustrate storage removal processing. First, the service processor of the operating terminal 20 or 22 takes the migration source volume 120 offline (S171) and brings the access paths linking the migration source volume 120 to the host 10, for example the access paths 130, 132, online (S172).

The service processor of the operating terminal 20 or 22 then deletes the pairing of the migration source volume 120 and the migration destination volume 122 (S173).

The host 10 then deletes information relating to the access paths 130, 132 linking the migration source volume 120 to the host 10 from the generation information 200 and the link information 300 (S174).

The system administrator then removes the storage paths 138, 140 linking the migration source volume 120 to the migration destination volume 122 and inputs an instruction to delete information in the storage connection path table 600 to the service processor of the operating terminal 20 or 22 (S175), removes the migration source volume 120 from the storage apparatus 16 (S176), and ends the processing of this routine.

Figure 23:
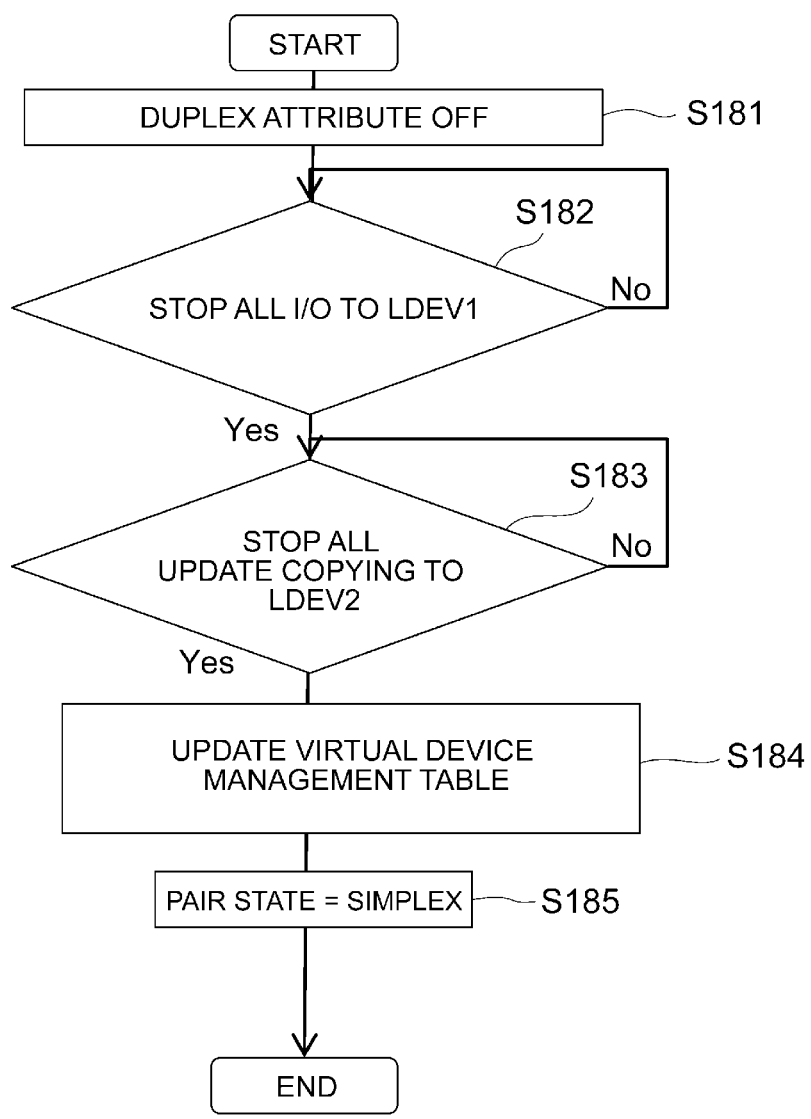
FIG. 23 is a flowchart serving to illustrate pair deletion processing.

FIG. 23 is a flowchart serving to illustrate the pair deletion processing. The specific content of this processing is step S173 of FIG. 22.

The service processor of the operating terminal 20 or 22 turns the duplex attribute of the virtual device management table 600 ON (S181) and determines whether or not the issuing of the command from the CPU 74 to the CPU 44 has completely stopped, that is, whether or not all the I/Os from the LDEV#2 to the LDEV#1 have stopped (S182).

If it is determined in step S182 that all the I/Os from the LDEV#2 to the LDEV#1 have stopped, the service processor determines whether or not all the issuing of commands from the CPU 44 to the CPU 74 has stopped, that is, whether or not all the update copying from the LDEV#1 to the LDEV#2 has stopped (S183).

If it is determined in step S183 that all the update copying from the LDEV#1 to the LDEV#2 has stopped, that is, that the duplexing of data is complete, the service processor updates the virtual device management table 600 (S184). For example, the service processor redefines the LDEV#1 by way of a new storage apparatus manufacturing number and deletes information relating to LDEV#2.

The service processor then configures the pair state of the pair configured from LDEV#1 and LDEV#2 (S185) and ends the processing of this routine.

Figure 24:
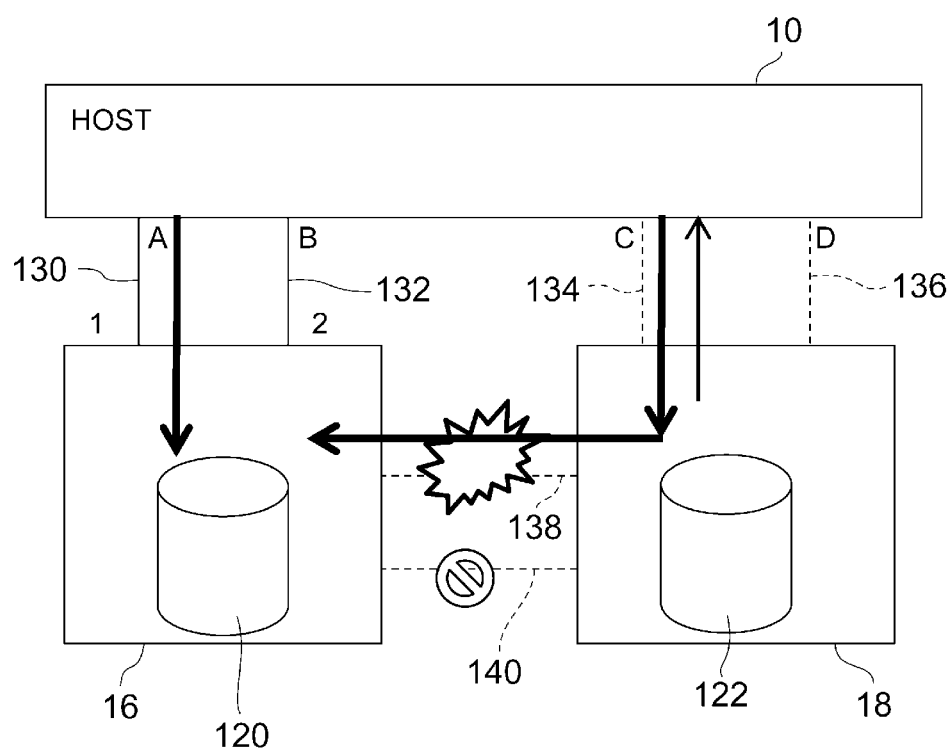
FIG. 24 is a conceptual diagram showing a state when there is a fault in a storage path.

FIG. 24 is a conceptual diagram showing a state when there is a storage path fault. In FIG. 24, there is a fault in ports B and D among the host ports A, B, C, and D, ports A and C are normal, one storage path 138 among storage paths 138, 140 is normal, and another storage path 140 is abnormal, the host 10 is able to access the migration source volume 120 via the access path 134 and the storage path 138, for example.

Thereafter, if a fault occurs in the storage path 138, migration which serves to migrate the data of the migration source volume 120 to the migration destination volume 122 stops. However, the host 10 is able to access the migration source volume 120 by using the access path 130 among alternate paths. Note that the host 10 is no longer able to use the access path 134 among the alternate paths to access the migration source volume 120.

Figure 25:
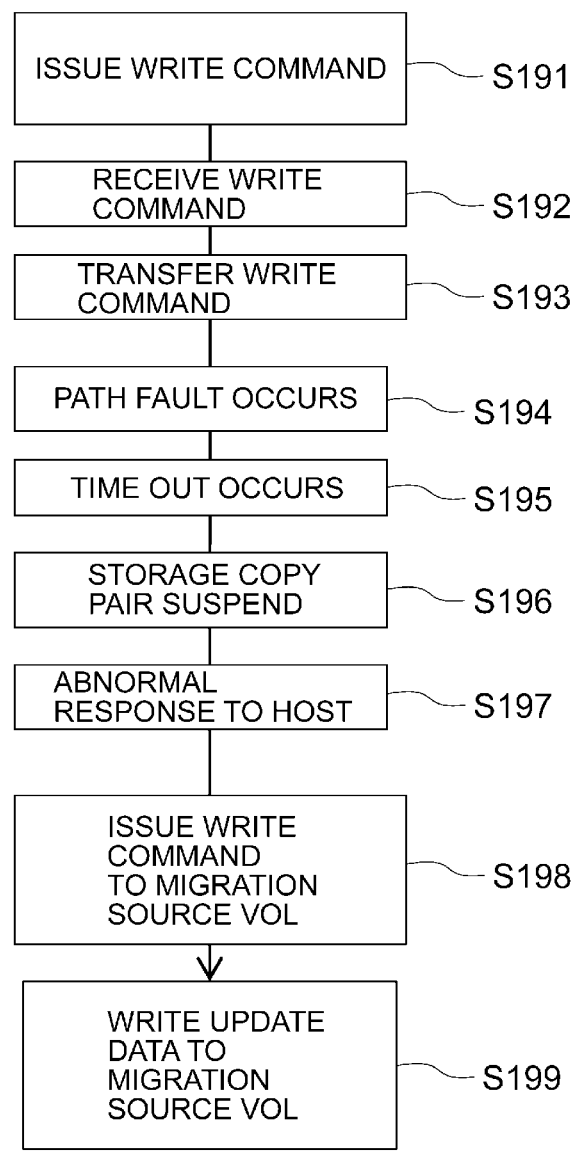
FIG. 25 is a flowchart serving to illustrate processing when there is a fault in a storage path.

FIG. 25 is a flowchart serving to illustrate processing at the time of a storage path fault. In FIG. 25, if there is a fault in ports B and D among the host ports A, B, C, and D, ports A and C are normal, one storage path 138 among storage paths 138, 140 is normal, and another storage path 140 is abnormal (see FIG. 24), the host 10 uses the access path 134 to issue a write command to the migration destination volume 122 (S191). The CPU 74 managing the migration destination volume 122 receives a write command (S192).

The CPU 74 transfers the received write command to the CPU 44 via the normal storage path 138 (S193). Here, if a path fault occurs in the storage path 138 (S194) and then the command transfer times out (S195), copying between storage which is being executed between the migration source volume 120 and the migration destination volume 122 enters pair suspension (S196). When the storage copying enters pair suspension, the CPU 74 sends back an abnormal response to the host 10 (S197).

The host 10 which receives the abnormal response uses the access path 130 which is a normal alternate path to issue the write command to the migration source volume 120 (S198). Here, the CPU 44 managing the migration source volume 120 stores the write data from the host 10 in the migration source volume 120 as update data (S199). In this case, the pair (the pair comprising the migration source volume 120 and the migration destination volume 122) is suspended and therefore update data is only stored in the migration source volume 120.

Accordingly, under the condition that two access paths 130, 132 are formed between the host 10 and the migration source volume 120, that two access paths 134, 136 are formed between the host 10 and the migration destination volume 122, and that two storage paths 138, 140 are formed between the migration source volume 120 and the migration destination volume 122, even when the access paths 132, 136 and the storage path 140 are abnormal, for example, I/Os by the host 10 can be continued and migration can be continued by using the normal access paths 130, 134 and the normal storage path 138. Further, even in cases where the access paths 132, 136 are abnormal and there is fault in all the storage paths 138, 140, migration is stopped but I/Os by the host 10 can be continued by using the normal access path 130.

Figure 26:
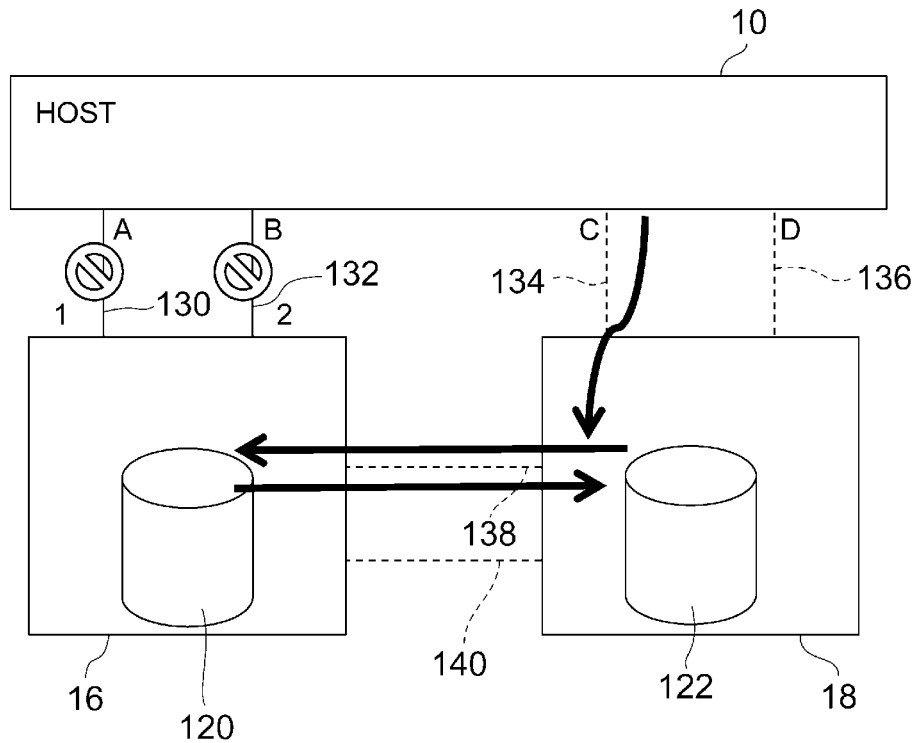
FIG. 26 is a conceptual diagram showing a state when there is a fault in a first access path.

FIG. 26 is a conceptual diagram showing a state during a fault in the first access path. In FIG. 26, in a case where there is a fault in ports A, B among the host ports A, B, C, D, there is an abnormality in the first access paths 130, 132, ports C and D are normal, and where the storage paths 138, 140 are normal, the host 10 is able to access the migration source volume 120 via the access path 134 and the storage path 138, and is able to access the migration destination volume 122 via the access path 134, for example.

Figure 27:
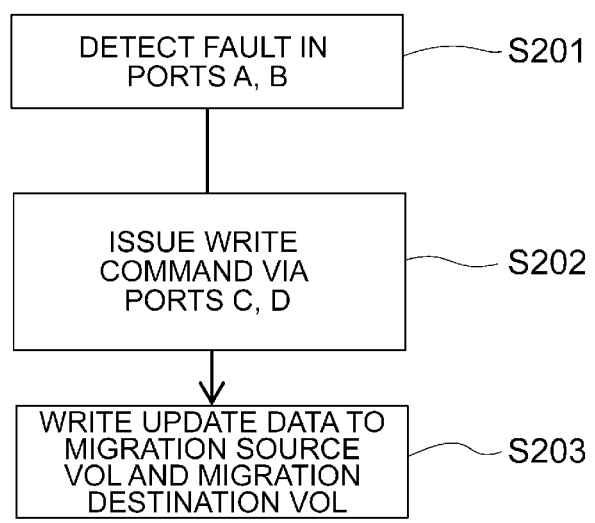
FIG. 27 is a flowchart serving to illustrate processing when there is a fault in the first access path.

FIG. 27 is a flowchart serving to illustrate processing when there is a fault in the first access path. In FIG. 27, under the condition that the first access paths 130, 132 are formed between the host 10 and the migration source volume 120 and that the second access paths 134, 136 are formed between the host 10 and the migration destination volume 12, if the host 10 detects a fault in the ports A, B which are connected to the first access paths 130, 132 (S201), the host 10 issues a write command to the CPU 74 managing the migration destination volume 122 by making the access path 134 among the normal second access paths 134, 136 the alternate path (S202). The CPU 74 which receives the write command transfers an update copy command to the CPU 44 via the storage path 138, for example. The CPU 44 stores update data in the migration source volume 120 and executes an update copy in which the stored update data is copied to the migration destination volume 122 via the storage path 138 (S203).

In this case, the CPU 44 is able to write update data to the migration source volume 120 and is able to perform the update copy to copy the update data of the migration source volume 120 to the migration destination volume 122 via the storage path 138. Further, the migration source volume 120 always stores the latest update data therefore the update data of the migration source volume 120 can be used to restore the latest data.

Figure 28:
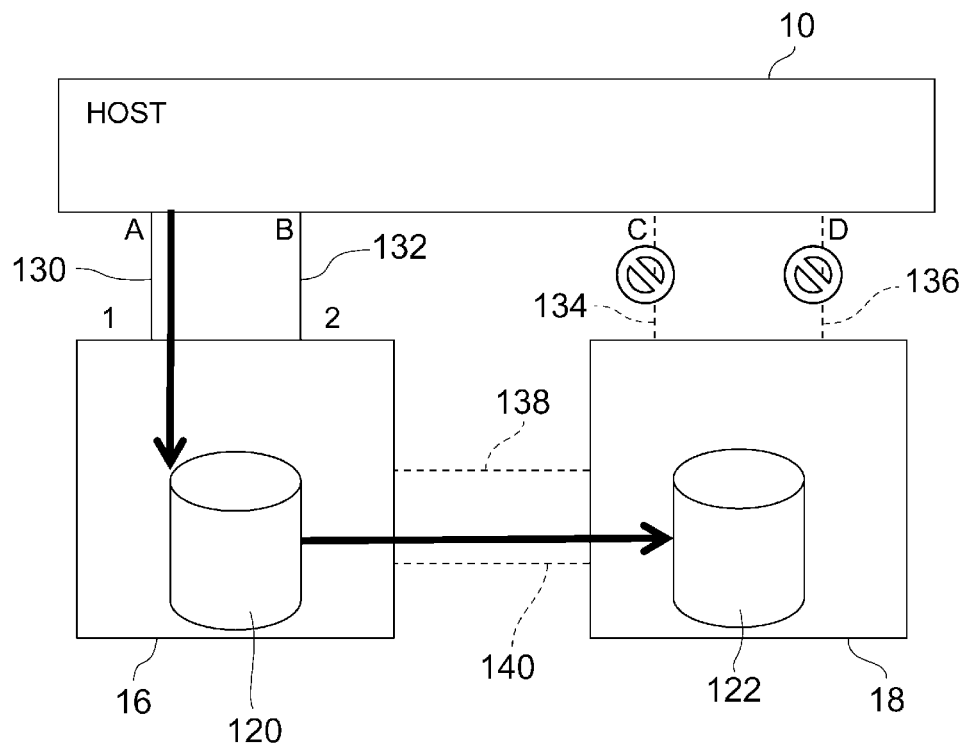
FIG. 28 is a conceptual diagram showing a state when there is a fault in a second access path.

FIG. 28 is a conceptual diagram showing the state when there is a fault in the second access path. In FIG. 28, in a case where there is a fault in ports C, C among the host ports A, B, C, D, there is abnormality in the second access paths 134, 136, where ports A, B are normal, and the storage paths 138, 140 are normal, the host 10 is able to access the migration source volume 120 via the access path 130. Further, an update copy to copy the data of the migration source volume 120 to the migration destination volume 122 via the access path 134 can be performed between the migration source volume 120 and the migration destination volume 122.

Figure 29:
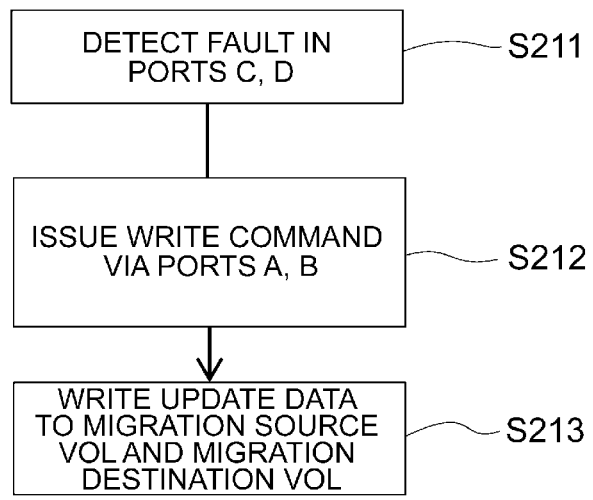
FIG. 29 is a flowchart serving to illustrate processing when there is a fault in the second access path.

FIG. 29 is a flowchart serving to illustrate processing when there is a fault in the second access path. In FIG. 29, under the condition that the first access paths 130, 132 are formed between the host 10 and the migration source volume 120 and that the second access paths 134, 136 are formed between the host 10 and the migration destination volume 122, if the host 10 detects a fault in the ports C, D which are connected to the second access paths 134, 136 (S211), the host 10 issues a write command to the CPU 44 managing the migration source volume 120 by making the access path 130, for example, among the normal first access paths 130, 132 the alternate path (S212). The CPU 44 which receives the write command is able to store the write data in the migration source volume 120 as update data and is able to copy the update data stored in the migration source volume 120 to the migration destination volume 122 via the storage path 140, for example (S213).

In this case, the CPU 44 is able to write the update data to the migration source volume 120 and is able to perform an update copy to copy data of the migration source volume 120 to the migration destination volume 122 via the storage path 140. Further, the migration source volume 120 always stores the latest update data and is therefore able to restore the latest data by using the data of the migration source volume 120.

In this embodiment, in a case where a first write command is received from the host 10 via the access path 130 or access path 132 during the period up until the access paths 130, 132 go offline after the formation copy processing to migrate the data of the migration source volume 120 to the migration destination volume 122 via the storage path 138 has ended, the CPU 44 functions as a migration source controller which writes the first update data appended to the first write command to the migration source volume 120 and transfers the first update data to the CPU 74 via the storage path 138.

In a case where the first update data transferred via the storage path 138 is received from the CPU 44, the CPU 74 functions as a migration destination controller which writes the received first update data to the migration destination volume 22 and, in a case where a second write command is received from the host 10 via the access path 134 or the access path 136 during the period up until the access paths 130, 132 go offline after the formation copy processing ends, the CPU 74 functions as a migration destination controller which writes second update data to the migration destination volume 122 under the condition that the second update data appended to the second write command is transferred to the CPU 44 via the storage path 138 and that the second update data is stored in the migration source volume 120.

Furthermore, in a case where the second update data transferred via the storage path 138 is received from the CPU 74, the CPU 44 functions as a migration source volume which writes the received second update data to the migration source volume 120.

According to this embodiment, in a case where the access paths 130, 132, 134, and 136 are each managed as alternate paths for accessing the migration source volume 120 and the migration destination volume 122 is virtualized as the migration source volume 120, the host 10 is able to continue host access by accessing the migration source volume 120 via the normal access path even when a path fault occurs in any of the access paths 130, 132, 134, 136, and the data of the migration source volume 120 can be held as the latest data.

Note that the present invention is not limited to the above embodiment, rather, the present invention encompasses a variety of modifications and is not necessarily limited to comprising all the described configurations. Furthermore, configurations of other embodiments can also be added to the configuration of a certain embodiment. Moreover, other configurations can also be added or deleted, or substituted for some of the configurations of the embodiment.

Furthermore, each of the above configurations and functions and the like may also be realized by hardware by designing some or all of the configurations and functions as an integrated circuit, for example. Further, each of the above configurations and functions and so on may also be realized by software as a result of the processor parsing and executing programs which implement the respective functions. Information such as programs, tables and files which realize each of the functions can also be recorded to and placed on recording devices such as a memory, hard disk, or SSD (Solid State Drive) or media such as an IC (Integrated Circuit) card, an SD (Secure Digital) memory card, or a DVD (Digital Versatile Disc).

REFERENCE SIGNS LIST

10 Host computer
10, 14 Network
16, 18 Storage apparatus
20, 22 Operating terminal
30 Channel adapter
32 Control unit
34 Disk adapter
36 Storage unit
38 Cache memory
40 Shared memory
42 Switch
44 CPU
46 Local memory
48 Storage device
60 Channel adapter
62 Control unit
64 Disk adapter
66 Storage unit
68 Cache memory
70 Shared memory
72 Switch
74 CPU
76 Local memory
78 Storage device

The invention claimed is:

1. A computer system, comprising:
a plurality of storage apparatuses which manage a plurality of storage devices; and
a host computer which exchanges information with each of the storage apparatuses,
wherein one storage apparatus among the plurality of storage apparatuses is managed as a migration source storage apparatus, another storage apparatus is managed as a migration destination storage apparatus, a logical volume which is constructed in a storage area of a storage device of the migration source storage apparatus is managed as a migration source volume, a logical volume which is constructed in a storage area of a storage device of the migration destination storage apparatus is managed as a migration destination volume, and the migration source volume and the migration destination volume are interconnected via a storage path,
wherein the migration source storage apparatus comprises a migration source controller which manages the migration source volume as an access target of the host computer,
wherein the migration destination storage apparatus comprises a migration destination controller which virtualizes the migration destination volume as the migration source volume and manages the virtualized migration destination volume as an access target of the host computer,
wherein, in a case where a first access path linking the host computer to the migration source volume and a second access path linking the host computer to the migration destination volume are each online and where the migration destination volume is virtualized as the migration source volume, the host computer manages each of the first access path and the second access path as alternate paths for accessing the migration source volume,
wherein, in a case where a first write command is received by the migration source controller from the host computer via the first access path during a period up until the first access path is offline after formation copy processing to migrate data of the migration source volume to the migration destination volume via the storage path has ended, the migration source controller writes first update data appended to the first write command to the migration source volume and executes an update copy to copy the first update data stored in the migration source volume to the migration destination volume, and
wherein, in a case where a second write command is received by the migration destination controller from the host computer via the second access path during the period up until the first access path is offline after formation copy processing has ended, the migration destination controller determines whether the second write command indicates a processing mode to be one of: a host frame transfer mode; a duplex transfer mode; and a simplex transfer mode,
upon determining the processing mode to be the host frame transfer mode, the migration destination controller transfers the second write command to the source destination controller without processing a frame of the second write command and the source destination controller stores second update data, appended to the second write command, in the migration source volume and sends an update completion notification to the migration destination controller that the second update data has been stored in the migration source volume,
upon determining the processing mode to be the duplex transfer mode, the migration destination controller processes the frame of the second write command and transfers the second update data appended to the second write command to the migration source controller via the storage path, as a first update copy command, and responsive to receiving the first update copy command, the migration source controller stores the second update data stored in the migration source volume and transfers a copy command to the migration destination controller to copy, in the migration destination volume, the second update data stored in the migration source volume, the migration destination controller writes the second update data to the migration destination volume, and sends a copy completion notification to the migration source controller and upon receiving the copy completion notification, the migration source controller sends a command completion notification prompting the migration destination controller to notify the host that the second write command is completed, and upon determining the processing mode to be the simplex transfer mode, the migration destination controller processes the frame of the second write command and transfers the second write command to the migration source controller as a second update copy command, the migration destination controller executes update copy processing to copy the second update data to the migration source volume and holds the update data in the migration destination volume, and upon receiving the second update copy command, the migration source controller stores the second update data in the migration source volume and sends a command completion notification to the migration destination controller which stores the second update data held in the migration destination volume and issues completion notification to the host that the second write command is completed.

2. The computer system according to claim 1, wherein, upon receiving the first write command, the migration source controller transfers first update data which is appended to the first write command to the migration destination controller via the storage path, wherein, upon receiving the first update data from the migration source controller, the migration destination controller writes the received first update data to the migration destination volume.

3. The computer system according to claim 1, wherein, upon receiving the first write command, the migration source controller transfers the first update data appended to the first write command to the migration destination controller via the storage path, wherein, upon receiving the first update data from the migration source controller, the migration destination controller writes the received first update data to the migration destination volume.

4. The computer system according to claim 1, wherein, if the first access path, the second access path, and the storage path are each formed in a plurality, the host computer accesses the migration destination volume via any second access path of the plurality of second access paths and, under the condition that an abnormal response to the effect that a path fault has occurred in the plurality of storage paths is received from the migration destination controller, the host computer accesses the migration source volume via any first access path among the plurality of first access paths.

5. The computer system according to claim 1, wherein, if the first access path, the second access path, and the storage path are each formed in a plurality, the host computer accesses the migration destination volume via any second access path of the plurality of second access paths under the condition that a fault in the plurality of first access paths is detected.

6. The computer system according to claim 1, wherein, if the first access path, the second access path, and the storage path are each formed in a plurality, the host computer accesses the migration source volume via any first access path of the plurality of first access paths under the condition that a fault in the plurality of second access paths is detected.

7. A data migration method for a computer system which comprises:
a plurality of storage apparatuses which manage a plurality of storage devices; and
a host computer which exchanges information with each of the storage apparatuses, wherein one storage apparatus among the plurality of storage apparatuses is managed as a migration source storage apparatus, another storage apparatus is managed as a migration destination storage apparatus, a logical volume which is constructed in a storage area of a storage device of the migration source storage apparatus is managed as a migration source volume, a logical volume which is constructed in a storage area of a storage device of the migration destination storage apparatus is managed as a migration destination volume, and the migration source volume and the migration destination volume are interconnected via a storage path,
wherein the migration source storage apparatus comprises a migration source controller which manages the migration source volume as an access target of the host computer,
wherein the migration destination storage apparatus comprises a migration destination controller which virtualizes the migration destination volume as the migration source volume and manages the virtualized migration destination volume as an access target of the host computer,
wherein, in a case where a first access path linking the host computer to the migration source volume and a second access path linking the host computer to the migration destination volume are each online and where the migration destination volume is virtualized as the migration source volume, the host computer manages each of the first access path and the second access path as alternate paths for accessing the migration source volume,
the data migration method comprising:
a step in which, in a case where a first write command is received by the migration source controller from the host computer via the first access path during a period up until the first access path is offline after formation copy processing to migrate data of the migration source volume to the migration destination volume via the storage path has ended, the migration source controller writes first update data appended to the first write command to the migration source volume and executes an update copy to copy the first update data stored in the migration source volume to the migration destination volume;
a step in which, in a case where a second write command is received by the migration destination controller from the host computer via the second access path during the period up until the first access path is offline after formation copy processing has ended, the migration destination controller determines whether the second write command indicates a processing mode to be one of: a host frame transfer mode; a duplex transfer mode; and a simplex transfer mode,
upon determining the processing mode to be the host frame transfer mode, the migration destination controller transfers the second write command to the source destination controller without processing a frame of the second write command and the source destination controller stores second update data, appended to the second write command, in the migration source volume and sends an update completion notification to the migration destination controller that the second update data has been stored in the migration source volume, upon determining the processing mode to be the duplex transfer mode, the migration destination controller processes the frame of the second write command and transfers second update data appended to the second write command to the migration source controller via the storage path as a first update copy command, and responsive to receiving the first update copy command, the migration source controller stores the second update data stored in the migration source volume, and transfers a copy command to the migration destination controller to copy, in the migration destination volume, the second update data stored in the migration source volume, the migration destination controller writes the second update data to the migration destination volume and sends a copy completion notification to the migration source controller and upon receiving the copy completion notification, the migration source controller sends a command completion notification prompting the migration destination controller to notify the host that the second write command is completed; and a step in which upon determining the processing mode to be the simplex transfer mode, the migration destination controller processes the frame of the second write command and transfers the second write command to the migration source controller as a second update copy command, the migration destination controller executes update copy processing to copy the second update data to the migration source volume and holds the update data in the migration destination volume, and upon receiving the second update copy command, the migration source controller stores the second update data in the migration source volume and sends a command completion notification to the migration destination controller which stores the second update data held in the migration destination volume and issues completion notification to the host that the second write command is completed.

8. The data migration method according to claim 7, comprising:
 a step in which, upon receiving the first write command, the migration source controller transfers first update data which is appended to the first write command to the migration destination controller via the storage path;
 a step in which, upon receiving the first update data from the migration source controller, the migration destination controller writes the received first update data to the migration destination volume.

9. The data migration method according to claim 7, comprising:
 a step in which, upon receiving the first write command, the migration source controller transfers the first update data appended to the first write command to the migration destination controller via the storage path;
 a step in which, upon receiving the first update data from the migration source controller, the migration destination controller writes the received first update data to the migration destination volume.

\* \* \* \* \*